(12) United States Patent
Karau

(10) Patent No.: US 12,270,201 B2
(45) Date of Patent: Apr. 8, 2025

(54) DECORATIVE BLOCK WITH LOAD-BEARING AREA

(71) Applicant: PAVESTONE, LLC, Atlanta, GA (US)

(72) Inventor: William H. Karau, Southlake, TX (US)

(73) Assignee: PAVESTONE, LLC, Atlanta, GA (US)

( * ) Notice: Subject to any disclaimer, the term of this patent is extended or adjusted under 35 U.S.C. 154(b) by 581 days.

(21) Appl. No.: 17/325,306

(22) Filed: May 20, 2021

(65) Prior Publication Data

US 2022/0372754 A1 Nov. 24, 2022

(51) Int. Cl.
  *E04C 1/39* (2006.01)
  *A01G 9/28* (2018.01)

(52) U.S. Cl.
  CPC ............... *E04C 1/395* (2013.01); *A01G 9/28* (2018.02)

(58) Field of Classification Search
  CPC ... E04C 1/00; E04C 1/395; E04C 1/39; E02D 29/02
  See application file for complete search history.

(56) References Cited

U.S. PATENT DOCUMENTS

| | | | | |
|---|---|---|---|---|
| 2,850,890 | A * | 9/1958 | Rubenstein | B28B 11/04 |
| | | | | 264/261 |
| D639,454 | S * | 6/2011 | Thomassen | E01C 5/06 |
| | | | | D25/113 |
| 8,141,315 | B1 * | 3/2012 | Shillingburg | E04C 1/395 |
| | | | | 52/603 |
| 8,603,424 | B2 | 12/2013 | Constantz et al. | |
| 8,869,477 | B2 | 10/2014 | Ha et al. | |
| 8,906,156 | B2 | 12/2014 | Constantz et al. | |
| 8,961,258 | B2 | 2/2015 | Bálint | |
| 9,038,346 | B1 * | 5/2015 | Wauhop | E04B 2/18 |
| | | | | 52/592.6 |
| 9,056,790 | B2 | 6/2015 | Chen et al. | |
| 9,725,904 | B2 | 8/2017 | Naccarato et al. | |
| 9,752,326 | B2 | 9/2017 | Kraus, Jr. et al. | |
| 9,957,670 | B2 | 5/2018 | Weaver | |
| 10,494,779 | B2 | 12/2019 | Dagher et al. | |
| 10,753,101 | B1 * | 8/2020 | Scanlan | E04C 2/04 |
| 2012/0063853 | A1 * | 3/2012 | Bott | E02D 29/025 |
| | | | | 52/561 |
| 2012/0192522 | A1 * | 8/2012 | Johnson | E04B 2/14 |
| | | | | 249/161 |
| 2013/0091798 | A1 * | 4/2013 | Vieira Da Cunha | E04B 2/02 |
| | | | | 52/561 |
| 2013/0111842 | A1 * | 5/2013 | Long | E04C 1/395 |
| | | | | 52/578 |
| 2013/0315678 | A1 * | 11/2013 | Karau | E04B 2/36 |
| | | | | 52/503 |

(Continued)

*Primary Examiner* — Paola Agudelo

(74) *Attorney, Agent, or Firm* — Jackson Walker LLP; Christopher J. Rourk

(57) ABSTRACT

A block is provided that includes a first side having a first predetermined load-bearing area and a first non-load-bearing area, the first predetermined load-bearing area having a first predetermined size and a first predetermined location. A second side having a second predetermined load-bearing area and a second non-load-bearing area, the second predetermined load-bearing area having a second predetermined size and a second predetermined location. Wherein the first non-load-bearing area does not extend beyond the first predetermined load-bearing area.

20 Claims, 43 Drawing Sheets

(56) References Cited

U.S. PATENT DOCUMENTS

| | | | |
|---|---|---|---|
| 2014/0260059 A1* | 9/2014 | Riccobene | E04C 1/395 52/604 |
| 2014/0272449 A1* | 9/2014 | MacDonald | E01C 5/16 428/141 |
| 2015/0097312 A1* | 4/2015 | MacDonald | E04C 1/395 425/453 |
| 2016/0090739 A1* | 3/2016 | Johnson | E04C 3/34 52/561 |
| 2016/0244936 A1* | 8/2016 | MacDonald | E04C 1/39 |
| 2018/0209142 A1* | 7/2018 | Ravelli | B28B 7/007 |
| 2019/0179061 A1 | 6/2019 | Constantz et al. | |
| 2019/0257080 A1* | 8/2019 | Harris | E04B 2/46 |
| 2019/0277001 A1* | 9/2019 | Riccobene | E04B 2/12 |
| 2019/0368152 A1* | 12/2019 | Rainey | E04C 1/395 |

* cited by examiner

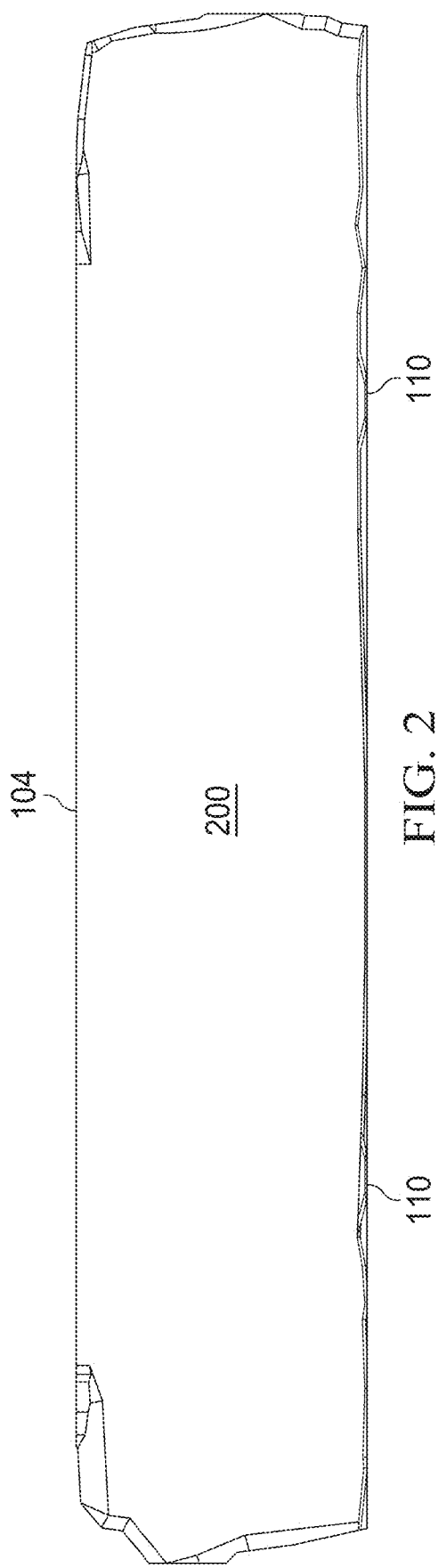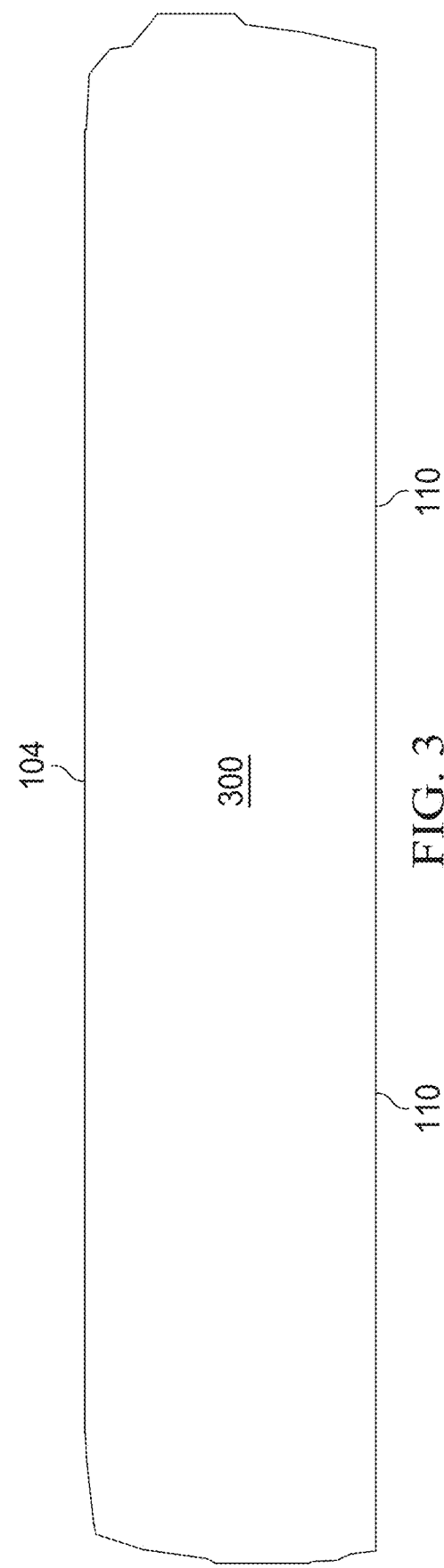

DECORATIVE BLOCK WITH LOAD-BEARING AREA

TECHNICAL FIELD

The present disclosure relates generally to decorative manufactured blocks for landscaping, and more specifically to a decorative manufactured block for landscaping with load-bearing areas to facilitate interchangeability and variations in appearance.

BACKGROUND OF THE INVENTION

Manufacturing decorative blocks for landscaping that do not have the appearance of being manufactured is difficult, because there is a need for variations that are difficult to manufacture.

SUMMARY OF THE INVENTION

A block is provided that includes a first side having a first predetermined load-bearing area and a first non-load-bearing area that can be adapted for ornamental uses, where the first predetermined load-bearing area has a first predetermined size and a first predetermined location. A second side has a second predetermined load-bearing area and a second non-load-bearing area that can be adapted for ornamental uses, where the second predetermined load-bearing area has a second predetermined size and a second predetermined location. The first non-load-bearing area does not extend beyond the first predetermined load-bearing area, so as to ensure that any load from a similar block that is placed on top will be born only by the load-bearing area, so as to provide a level fit.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 2 shows a front elevation view of the first decorative manufactured block with load-bearing areas, in accordance with an example embodiment of the present disclosure;

FIG. 3 shows a rear elevation view of the first decorative manufactured block with load-bearing areas, in accordance with an example embodiment of the present disclosure;

DETAILED DESCRIPTION OF THE INVENTION

Figure 1:
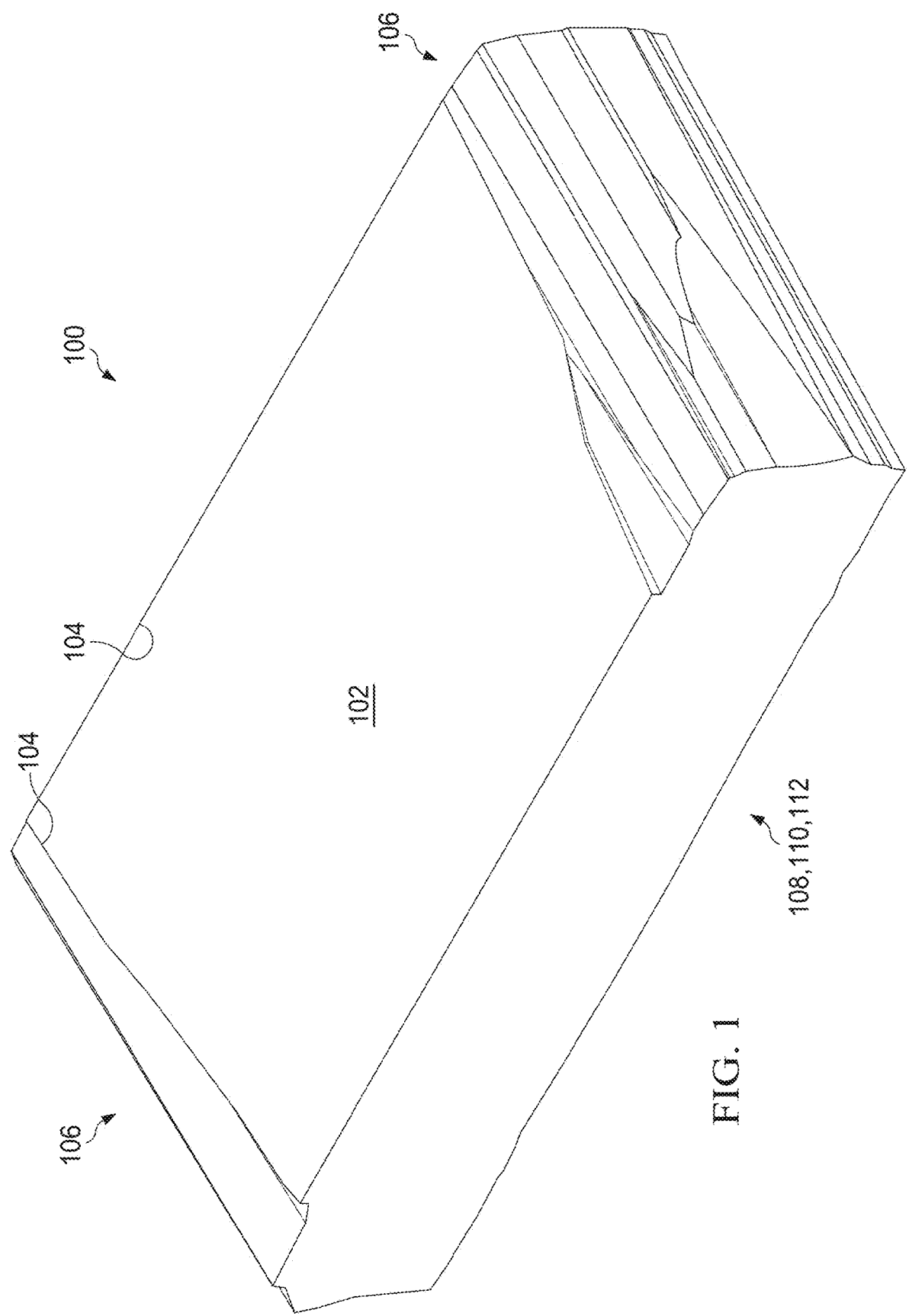
FIG. 1 shows a front perspective of a first decorative manufactured block with load-bearing areas, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

FIG. 1 shows a front perspective of a first decorative manufactured block with load-bearing areas, in accordance with an example embodiment of the present disclosure. The first decorative manufactured block and all other decorative manufactured blocks shown herein can be formed from concrete, masonry, composites, stone aggregates or other suitable materials or combinations of materials, by dry casting processes, wet casting processes, molding processes or in other suitable manners.

The first decorative manufactured block 100 has a first side 102, such as the top, which has a first predetermined load-bearing area 104 (which is shown as the large flat area) and a first non-load-bearing area 106 (which is shown as the stepped and random areas on either side). The first predetermined load-bearing area 104 has a first predetermined size and a first predetermined location, and also has a predetermined load bearing capacity to allow it to be placed in combination with other decorative manufactured blocks. In one example embodiment, the load bearing capacity can be directly related to the size of the first predetermined load-bearing area 104, such as where a block that is going to be used in a wall with a stack of 20 other blocks can be provided with a first predetermined load-bearing area 104 that is larger than a block that is going to be used in a wall with a stack of only 10 other blocks. Likewise, the blocks can have different predetermined load-bearing areas 104, such as where the blocks at the bottom of the wall that will bear a greater load have a larger predetermined load-bearing area 104 than the blocks that will be placed at a higher location and which will bear a lesser load than the blocks at the bottom.

Figure 7:
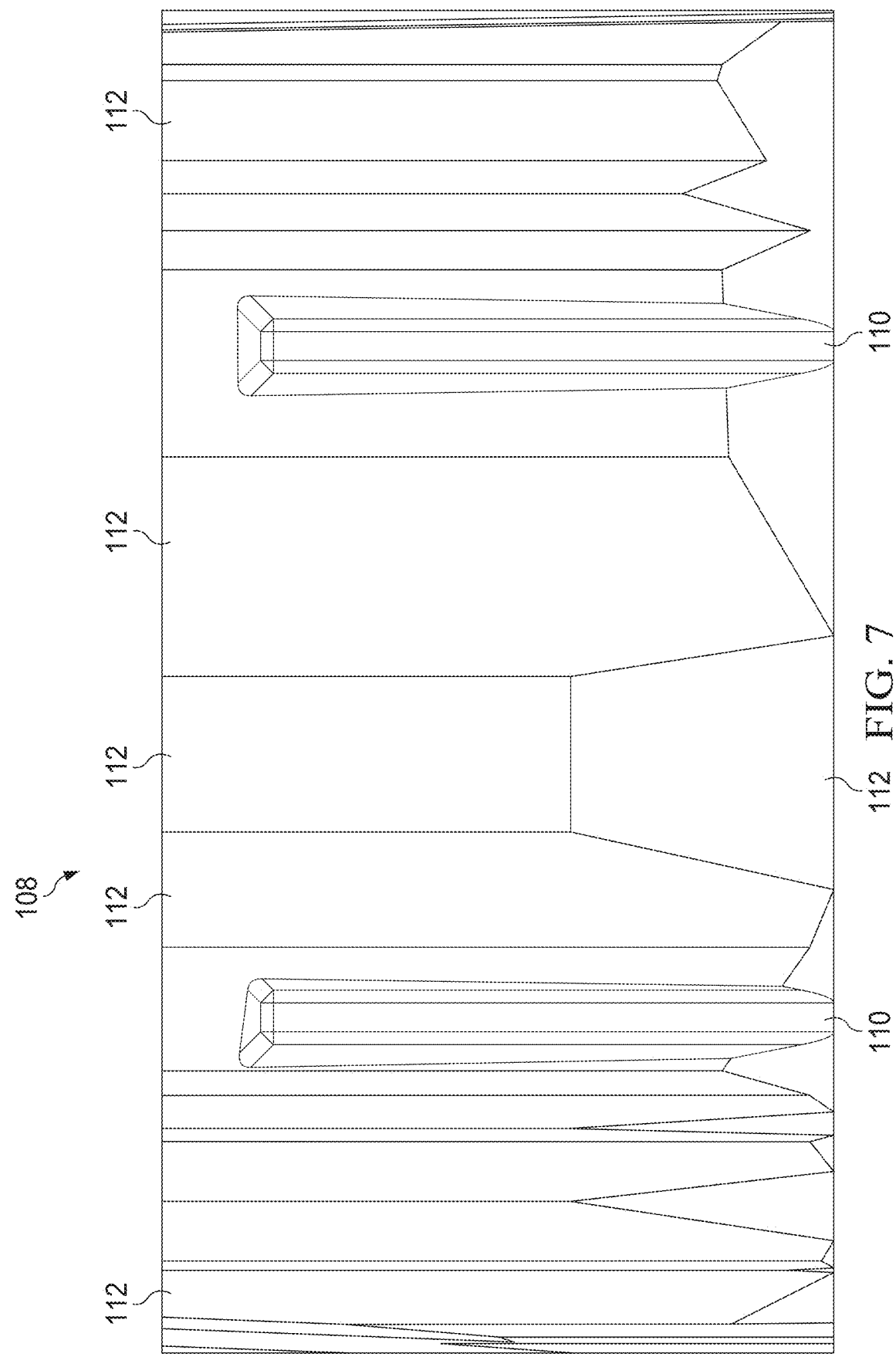
FIG. 7 shows a bottom view of the first decorative manufactured block with load-bearing areas, in accordance with an example embodiment of the present disclosure.

The first decorative manufactured block also has a second side 108 having a second predetermined load-bearing area 110 and a second non-load-bearing area 112, such as at the bottom (not explicitly shown in FIG. 1, shown in FIG. 7). The second predetermined load-bearing area 110 can have a second predetermined size that is identical to that of the first predetermined load-bearing area 104, and a second predetermined location that corresponds to the first predetermined load-bearing area 104, such as to overlay the first predetermined load-bearing area 104 when a second one of the first decorative manufactured blocks 100 is placed on top of a first one of the first decorative manufactured blocks 100. In this manner, the load-bearing areas can align and bear the load of blocks, so that the non-load-bearing areas can be textured in a predetermined or variable manner. In order to accomplish this load-bearing function, the first non-load-bearing area 106 should not extend beyond the first predetermined load-bearing area 104, such as along a surface plane that extends from the first predetermined load-bearing area 104, and the second non-load-bearing area 112 should not extend beyond the second predetermined load-bearing area 110, such as along a surface plane that extends from the second predetermined load-bearing area, so as not to interfere with the ability of the load-bearing areas to bear load. If the non-load-bearing area does extend beyond the load-bearing area, then it could interfere with the ability of the first decorative manufactured block to be used to form walls or other structures.

While the first load-bearing area can be planar, it can also be non-planar in predetermined areas, as long as it is possible to define a plane or other suitable boundary beyond which the first non-load-bearing area should not extend. Likewise, the second load-bearing area can be planar, and it can also be non-planar in predetermined areas, as long as it is possible to define a plane or other suitable boundary beyond which the second non-load-bearing area should not extend. The objective is to create a first decorative manufactured block that has predetermined areas that can bear a load and predetermined areas that do not need to bear a load and which can be textured to appear to not be manufactured. In this manner, the non-load-bearing areas can be variable so as to create an appearance that does not resemble a manufactured block in combination with other blocks, either by having a sufficient number of configurations to allow an artisan to arrange the blocks in a manner that does not appear to have any repeating appearances, by providing a material for non-load-bearing areas that can be weathered, tumbled, textured, worn, scored or otherwise damaged in combination with a material for load-bearing areas that is durable and resistance to such damage, or in other suitable manners.

In addition, the load bearing capacity of the load-bearing areas can be determined as a function of the application, such as to provide a larger load bearing capacity for blocks that will be stacked higher than for blocks that will not be stacked as high. For example, a block that will be stacked in stacks of 20 blocks in height could have a load-bearing area that is twice as great as the load-bearing area for a block that will only be stacked in stacks of 10 blocks in height. Alternatively, different blocks could be used at different stages, such as blocks with a larger load-bearing area at the bottom layers of a stack and blocks with a smaller load-bearing area at the top layers of the stack.

Further, load-bearing areas can be provided at the sides of the block to create a block with a predetermined dimension. In this manner, structures formed from the blocks can have a predetermined design and will not need to be modified in the field, such as to cut blocks to create a corner of a wall or other suitable structures.

While the blocks shown in the FIGURES thus have certain functional attributes, they also have certain ornamental and non-functional attributes that are independent of the functional attributes. As such, both the functional and ornamental attributes are disclosed herein, although only the functional attributes are encompassed by the claims.

FIG. 2 shows a front 200 elevation view of the first decorative manufactured block 100 with load-bearing areas 104 and 110, in accordance with an example embodiment of the present disclosure.

FIG. 3 shows a rear 300 elevation view of the first decorative manufactured block 100 with load-bearing areas 104 and 110, in accordance with an example embodiment of the present disclosure.

Figure 4:
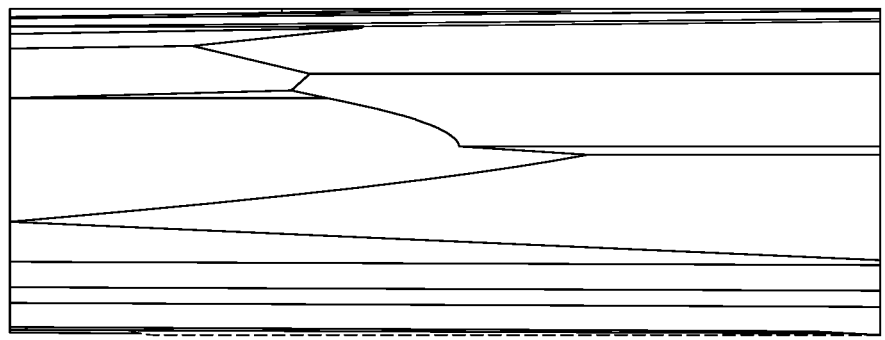
FIG. 4 shows a right side view of the first decorative manufactured block with load-bearing areas, in accordance with an example embodiment of the present disclosure.

FIG. 4 shows a right side view of the first decorative manufactured block with load-bearing areas, in accordance with an example embodiment of the present disclosure.

Figure 5:
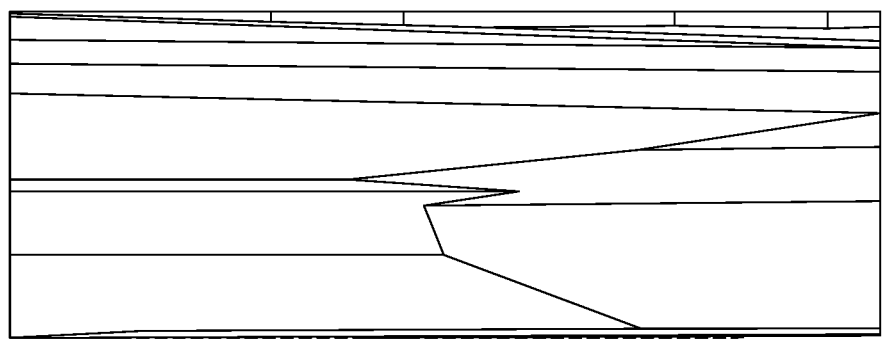
FIG. 5 shows a left side view of the first decorative manufactured block with load-bearing areas, in accordance with an example embodiment of the present disclosure.

FIG. 5 shows a left side view of the first decorative manufactured block with load-bearing areas, in accordance with an example embodiment of the present disclosure.

Figure 6:
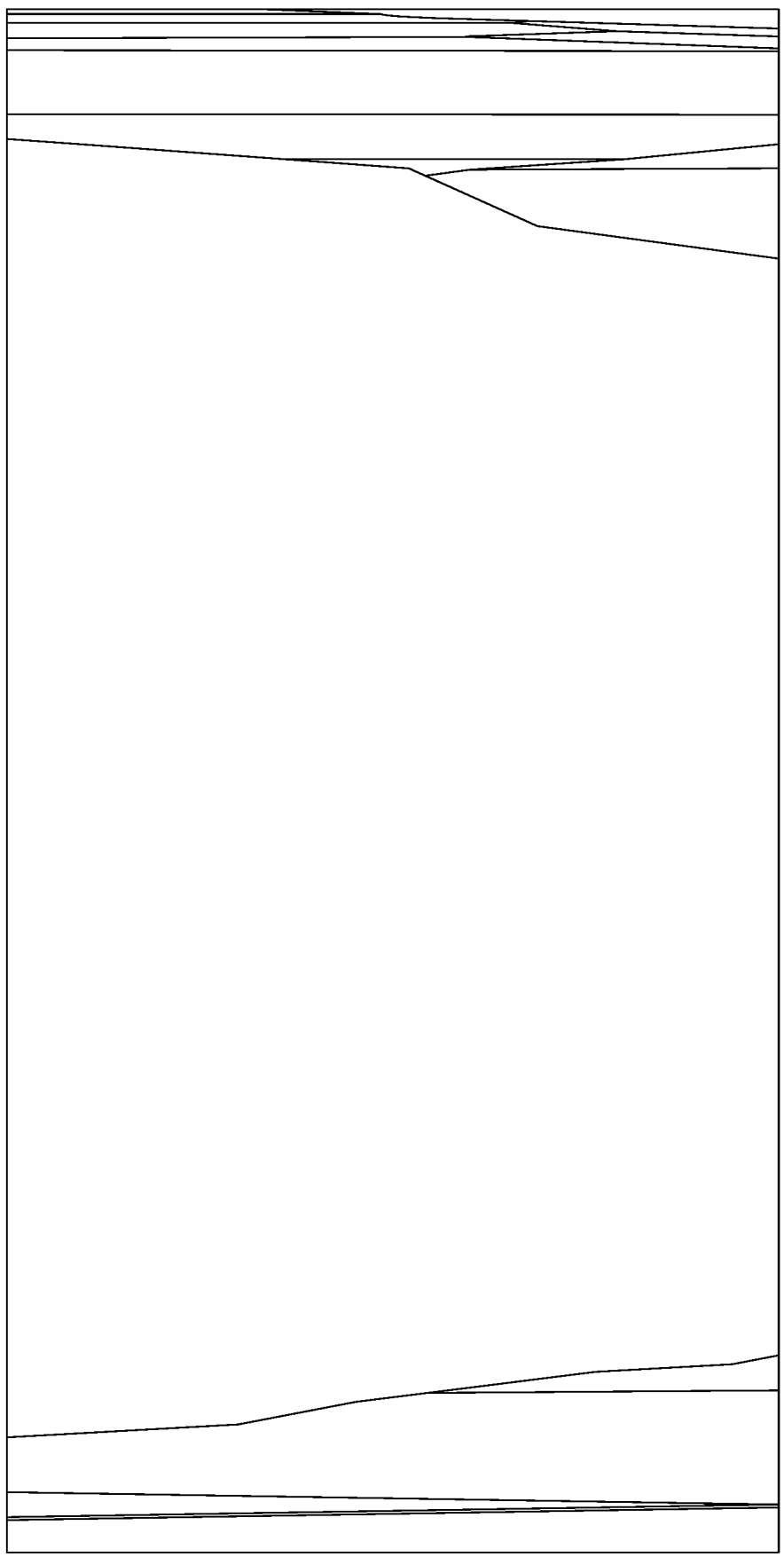
FIG. 6 shows a top view of the first decorative manufactured block with load-bearing areas, in accordance with an example embodiment of the present disclosure.

FIG. 6 shows a top view of the first decorative manufactured block with load-bearing areas, in accordance with an example embodiment of the present disclosure.

FIG. 7 shows a bottom view of the first decorative manufactured block 100 with load-bearing areas 110, in accordance with an example embodiment of the present disclosure. The load-bearing areas 110 of the first decorative manufactured block are shown with dashed lines, and in application these areas may be further obscured with weathering or other manufacturing processes to hide their appearance, as long as the functionality of the load-bearing area is not altered. In this regard, the materials that the load-bearing areas 110 are made from can be different from the materials that the rest of the decorative manufactured block is made from, such as a concrete core surrounded by a softer masonry material that can be more easily textured, to alter the appearance of each decorative manufactured block. The material that the load-bearing areas 110 are made from should be strong enough to support a predetermined number of blocks, such as 10 to 20, depending on the applications that the blocks will be used for.

Figure 8:
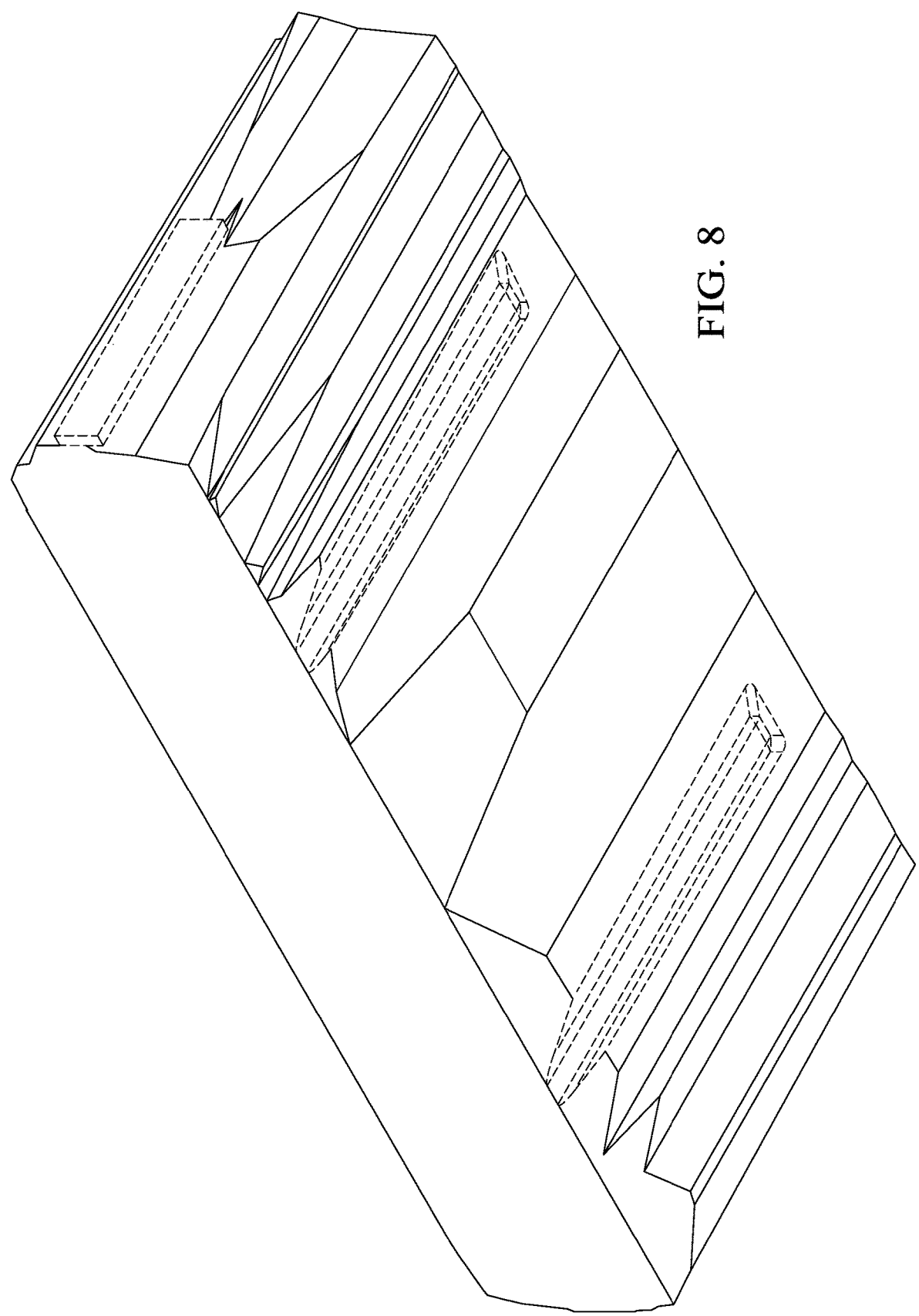
FIG. 8 shows a rear perspective of the first decorative manufactured block with load-bearing areas, in accordance with an example embodiment of the present disclosure.

FIG. 8 shows a rear perspective of the first decorative manufactured block with load-bearing areas, in accordance with an example embodiment of the present disclosure. The load-bearing areas are shown with dashed lines, and in application these areas may be further obscured with weathering or other manufacturing processes to hide their appearance, as long as the functionality of the load-bearing area is not altered.

Figure 9:
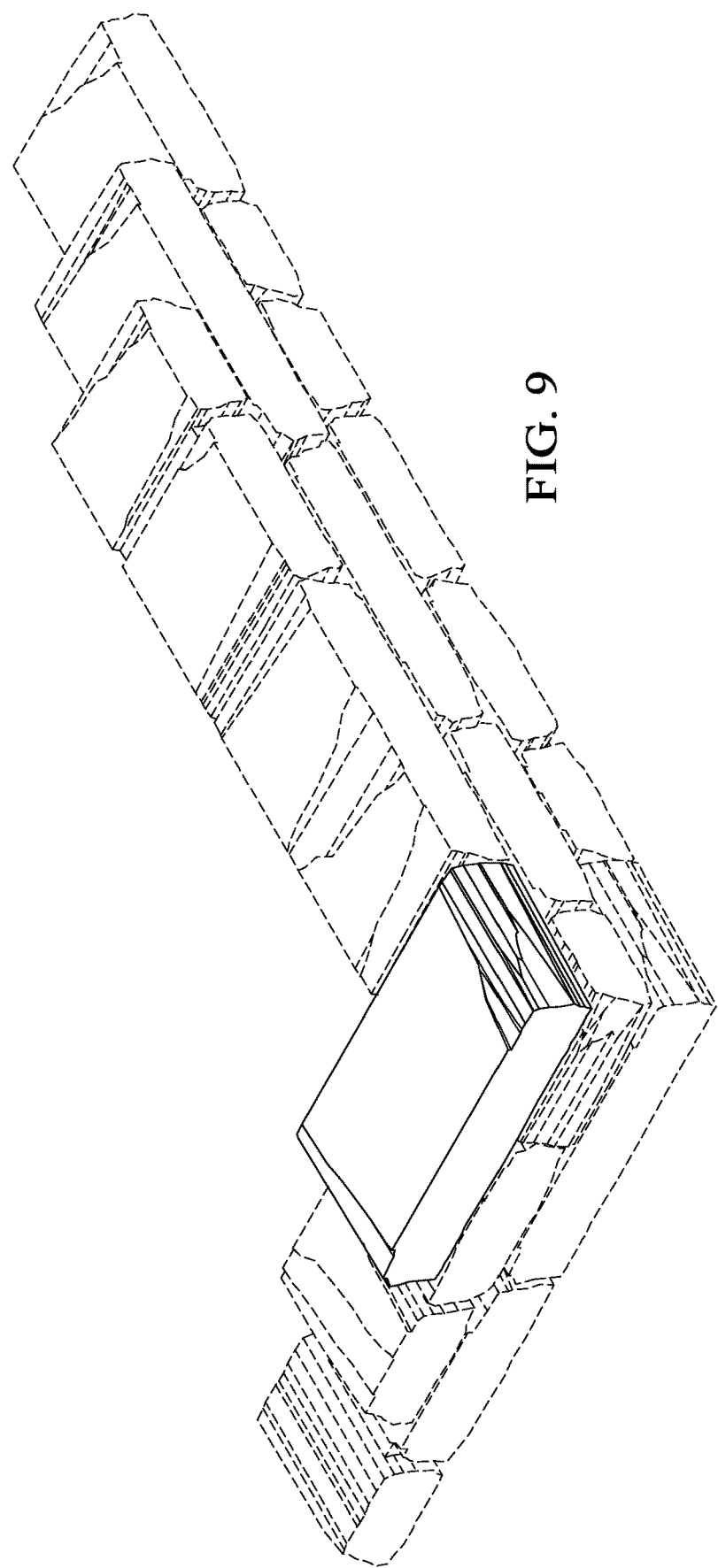
FIG. 9 shows an environmental view of the first decorative manufactured block with load-bearing areas, in accordance with an example embodiment of the present disclosure.

FIG. 9 shows an environmental view of the first decorative manufactured block with load-bearing areas, in accordance with an example embodiment of the present disclosure.

Figure 10:
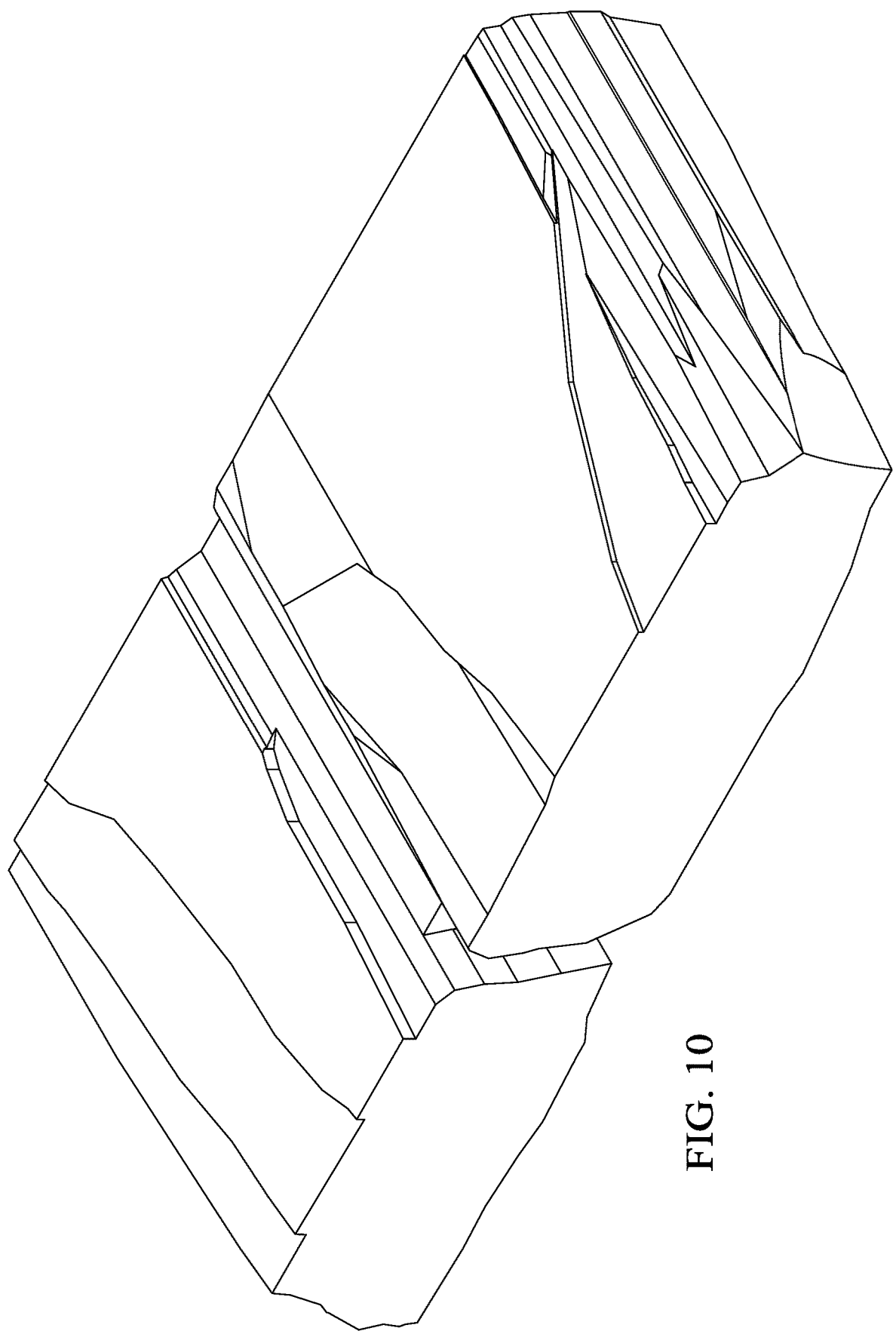
FIG. 10 shows a front perspective of a second decorative manufactured block with load-bearing areas and a false joint, in accordance with an example embodiment of the present disclosure.

FIG. 10 shows a front perspective of a second decorative manufactured block with load-bearing areas and a false joint, in accordance with an example embodiment of the present disclosure.

Figure 11:
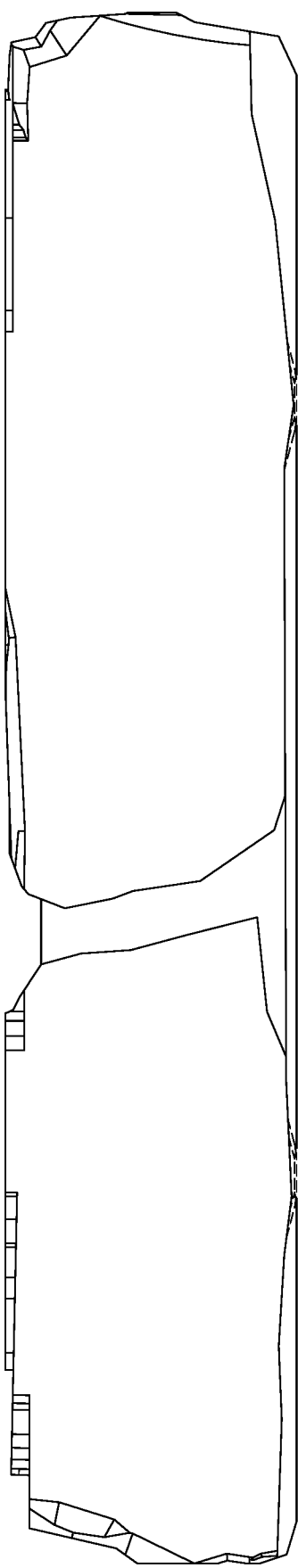
FIG. 11 shows a front elevation view of the second decorative manufactured block with load-bearing areas and a false joint, in accordance with an example embodiment of the present disclosure.

FIG. 11 shows a front elevation view of the second decorative manufactured block with load-bearing areas and a false joint, in accordance with an example embodiment of the present disclosure.

Figure 12:
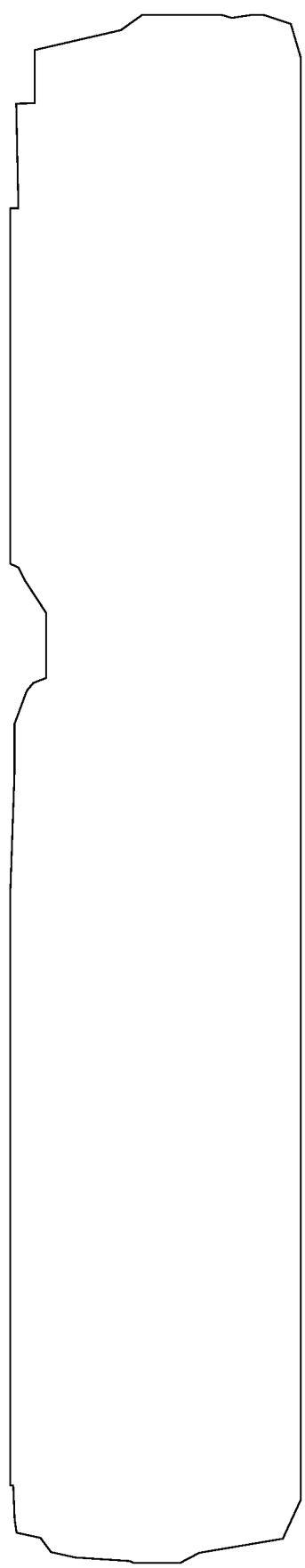
FIG. 12 shows a rear elevation view of the second decorative manufactured block with load-bearing areas and a false joint, in accordance with an example embodiment of the present disclosure.

FIG. 12 shows a rear elevation view of the second decorative manufactured block with load-bearing areas and a false joint, in accordance with an example embodiment of the present disclosure.

Figure 13:
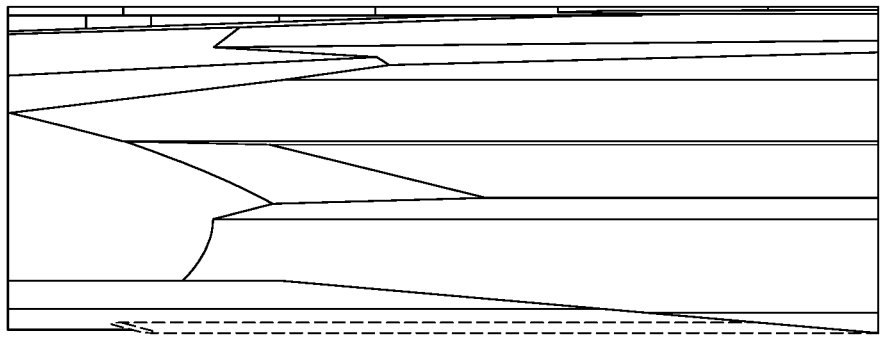
FIG. 13 shows a right side view of the second decorative manufactured block with load-bearing areas and a false joint, in accordance with an example embodiment of the present disclosure.

FIG. 13 shows a right side view of the second decorative manufactured block with load-bearing areas and a false joint, in accordance with an example embodiment of the present disclosure.

Figure 14:
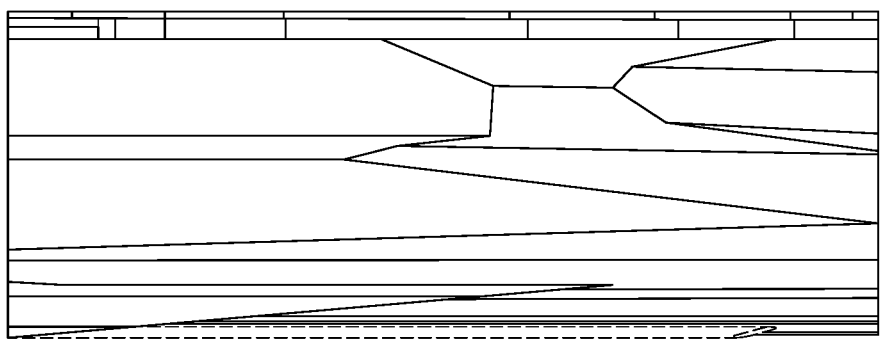
FIG. 14 shows a left side view of the second decorative manufactured block with load-bearing areas and a false joint, in accordance with an example embodiment of the present disclosure.

FIG. 14 shows a left side view of the second decorative manufactured block with load-bearing areas and a false joint, in accordance with an example embodiment of the present disclosure.

Figure 15:
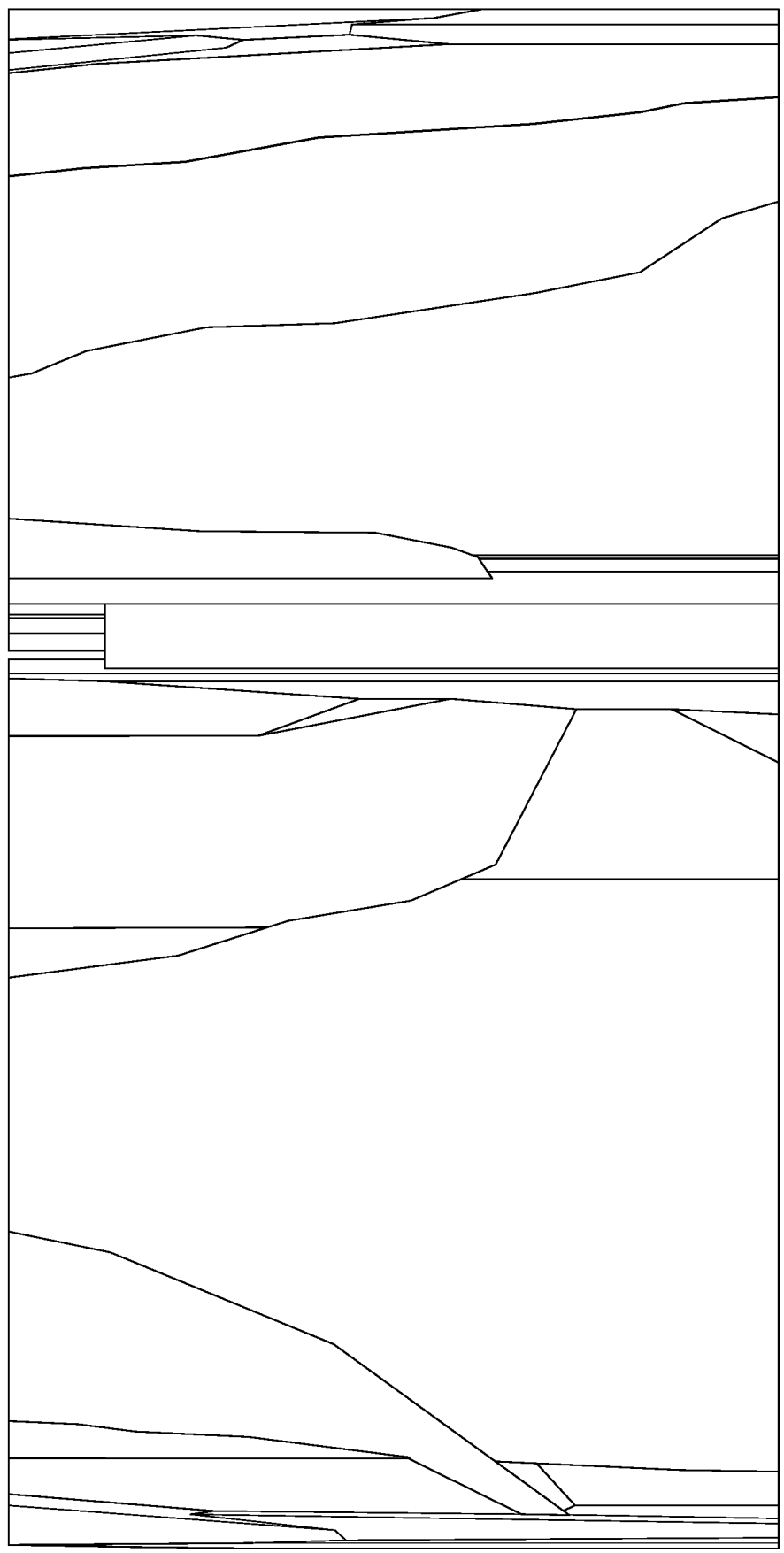
FIG. 15 shows a top view of the second decorative manufactured block with load-bearing areas and a false joint, in accordance with an example embodiment of the present disclosure.

FIG. 15 shows a top view of the second decorative manufactured block with load-bearing areas and a false joint, in accordance with an example embodiment of the present disclosure.

Figure 16:
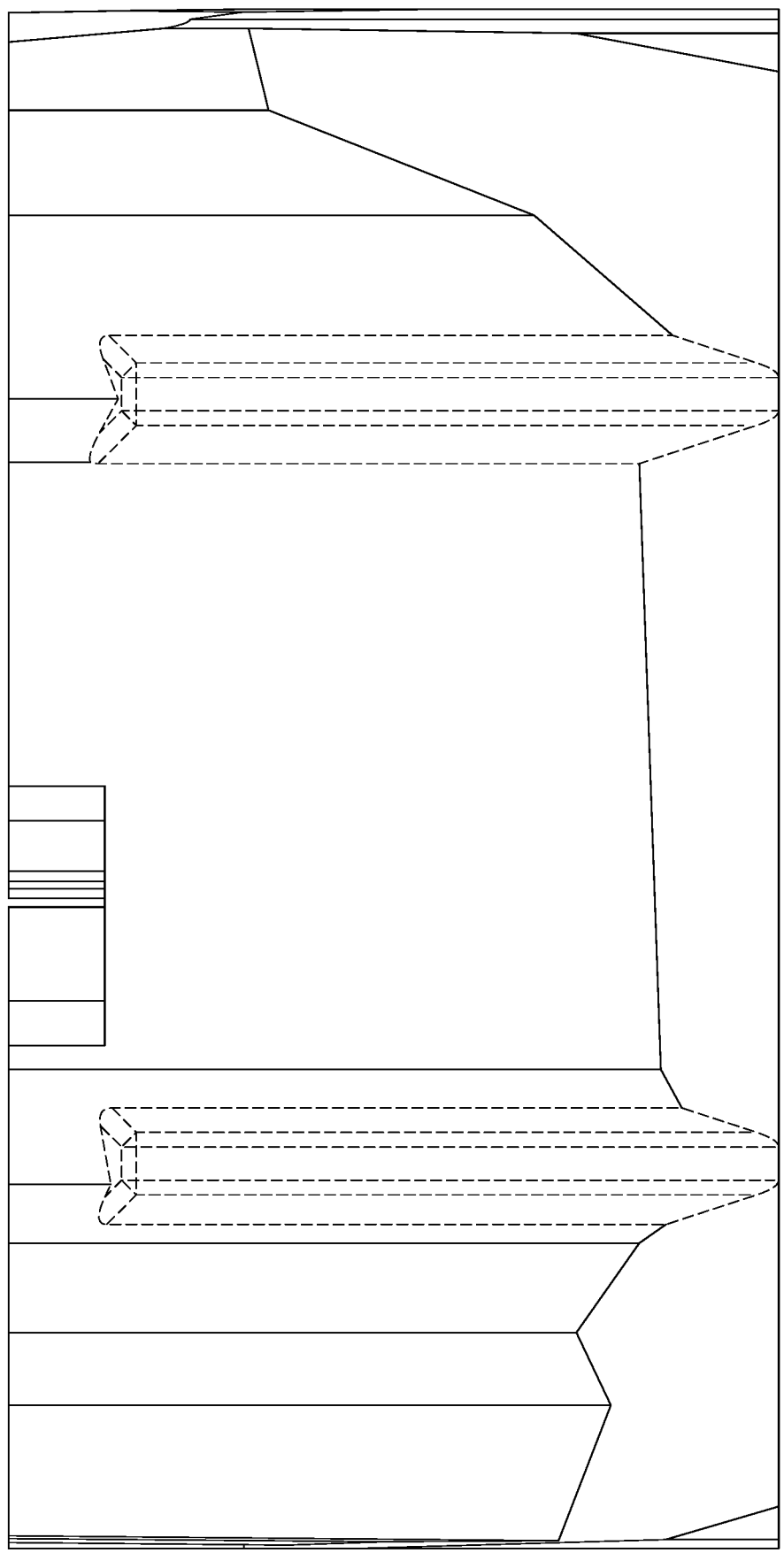
FIG. 16 shows a bottom view of the second decorative manufactured block with load-bearing areas and a false joint, in accordance with an example embodiment of the present disclosure.

FIG. 16 shows a bottom view of the second decorative manufactured block with load-bearing areas and a false joint, in accordance with an example embodiment of the present disclosure. The load-bearing areas are shown with dashed lines, and in application these areas may be further obscured with weathering or other manufacturing processes to hide their appearance, as long as the functionality of the load-bearing area is not altered.

Figure 17:
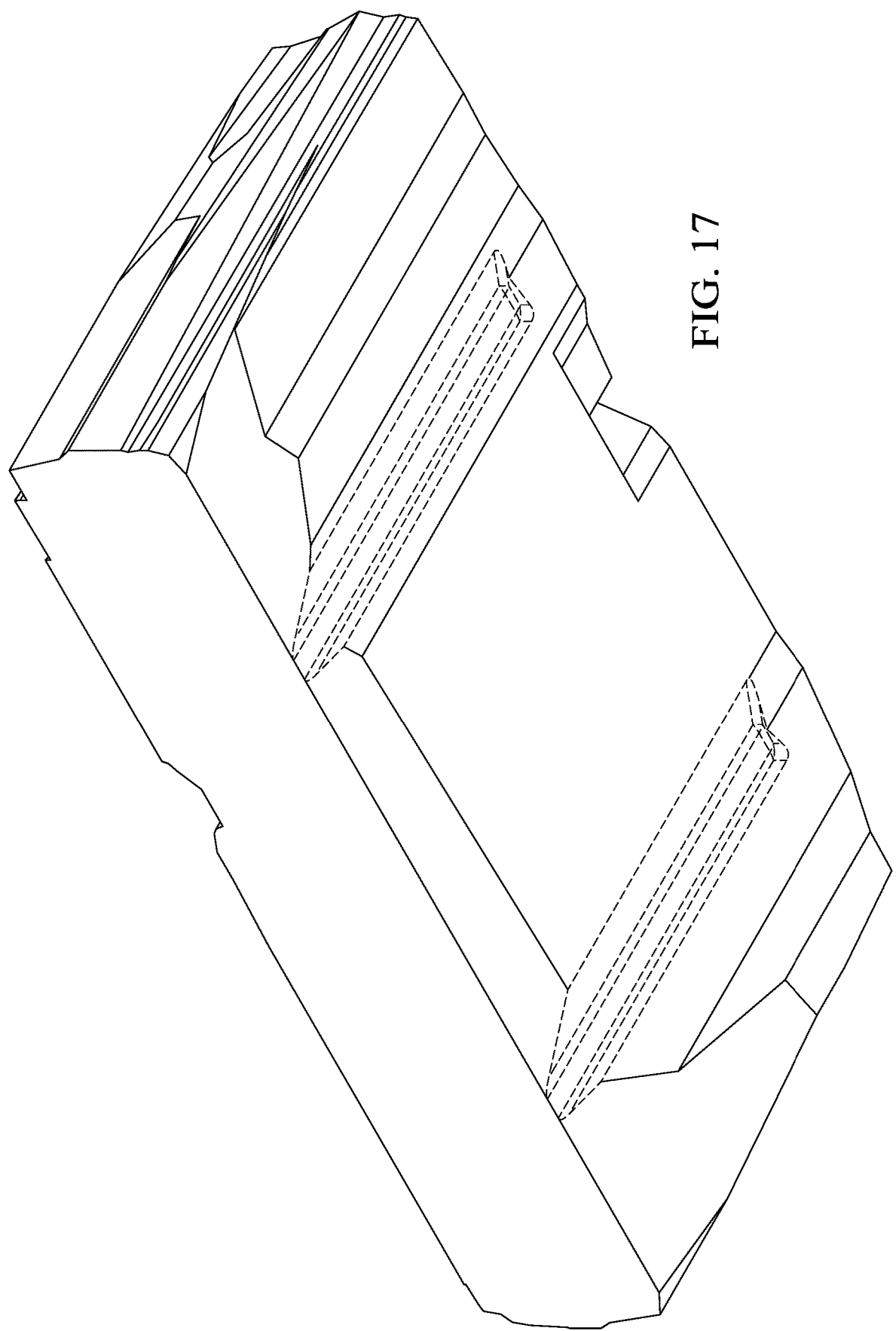
FIG. 17 shows a rear perspective of the second decorative manufactured block with load-bearing areas and a false joint, in accordance with an example embodiment of the present disclosure.

FIG. 17 shows a rear perspective of the second decorative manufactured block with load-bearing areas and a false joint, in accordance with an example embodiment of the present disclosure. The load-bearing areas are shown with dashed lines, and in application these areas may be further obscured with weathering or other manufacturing processes to hide their appearance, as long as the functionality of the load-bearing area is not altered.

Figure 18:
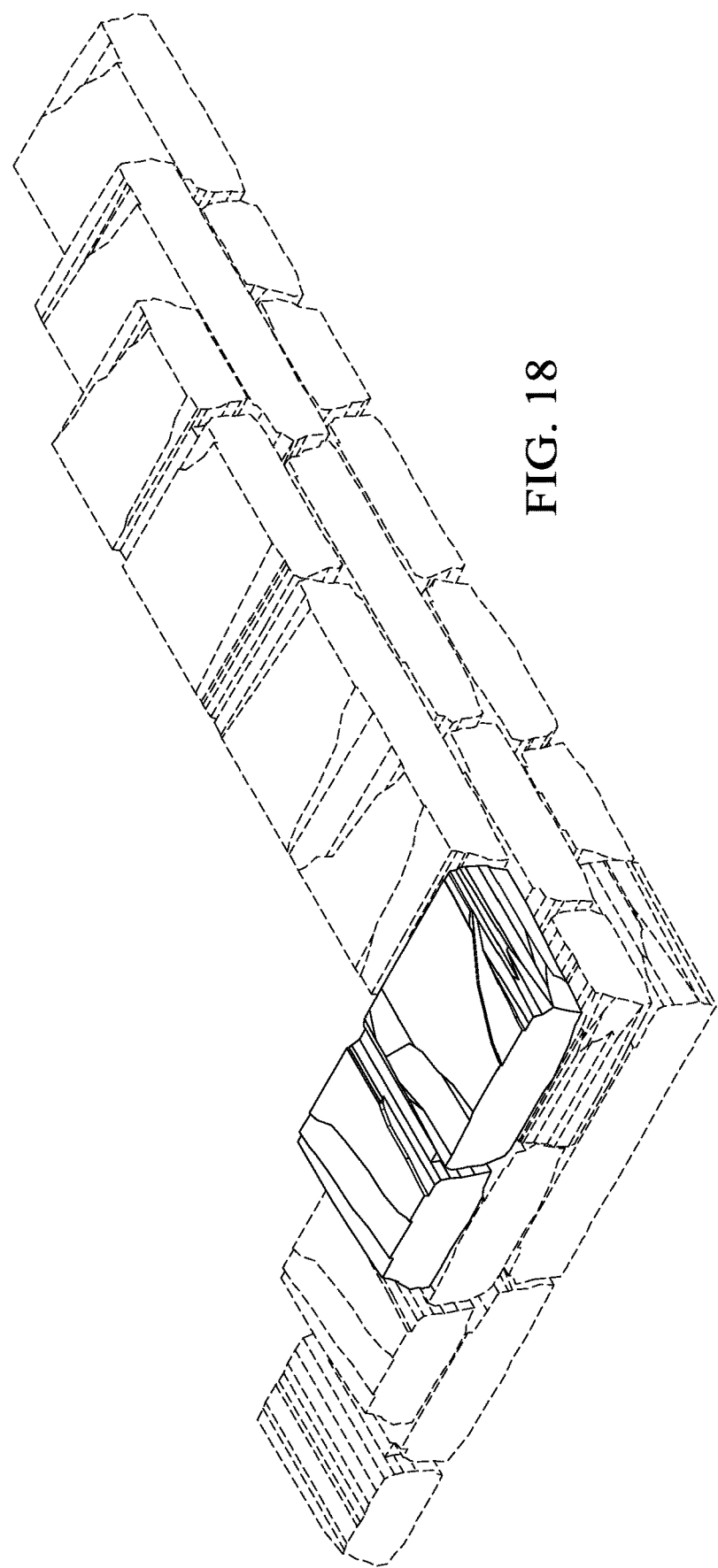
FIG. 18 shows an environmental view of the second decorative manufactured block with load-bearing areas and a false joint, in accordance with an example embodiment of the present disclosure.

FIG. 18 shows an environmental view of the second decorative manufactured block with load-bearing areas and a false joint, in accordance with an example embodiment of the present disclosure.

Figure 19:
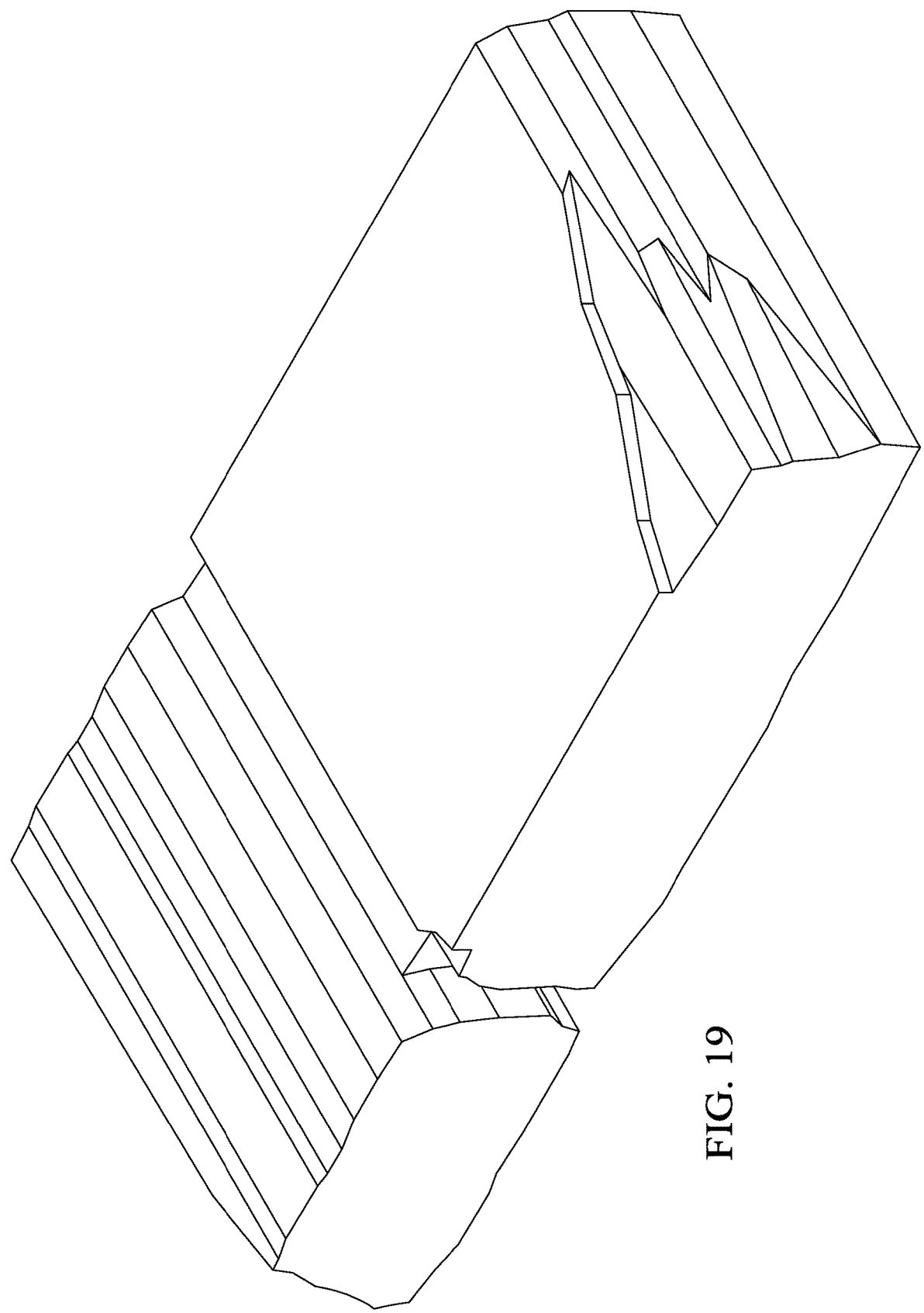
FIG. 19 shows a front perspective of a third decorative manufactured block with load-bearing areas and a false joint, in accordance with an example embodiment of the present disclosure.

FIG. 19 shows a front perspective of a third decorative manufactured block with load-bearing areas and a false joint, in accordance with an example embodiment of the present disclosure.

Figure 20:
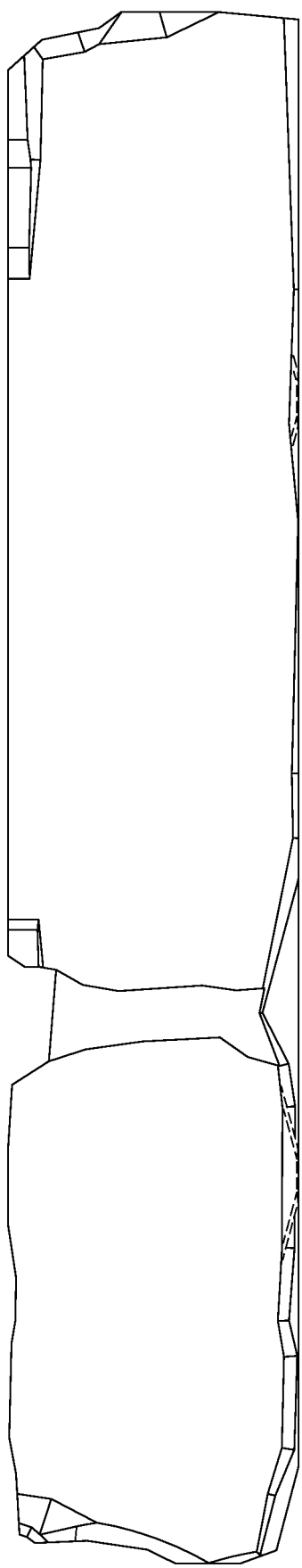
FIG. 20 shows a front elevation view of the third decorative manufactured block with load-bearing areas and a false joint, in accordance with an example embodiment of the present disclosure.

FIG. 20 shows a front elevation view of the third decorative manufactured block with load-bearing areas and a false joint, in accordance with an example embodiment of the present disclosure.

Figure 21:
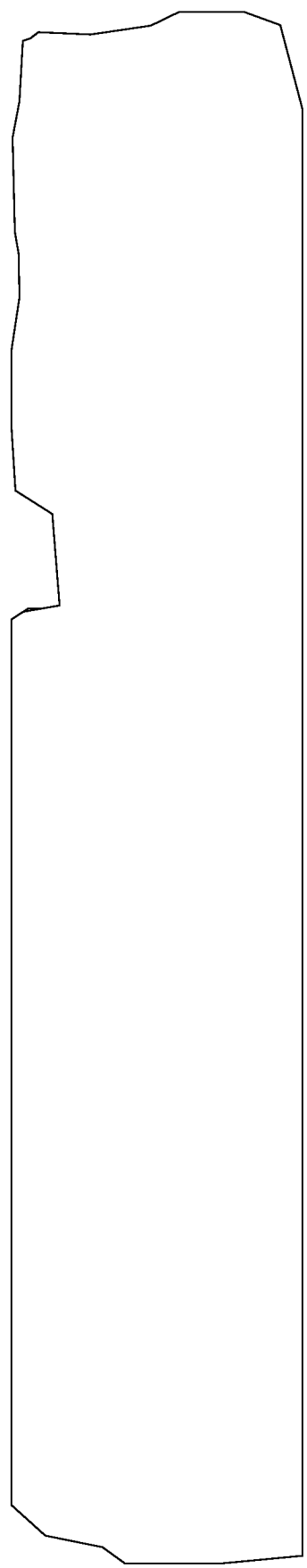
FIG. 21 shows a rear elevation view of the third decorative manufactured block with load-bearing areas and a false joint, in accordance with an example embodiment of the present disclosure.

FIG. 21 shows a rear elevation view of the third decorative manufactured block with load-bearing areas and a false joint, in accordance with an example embodiment of the present disclosure.

Figure 22:
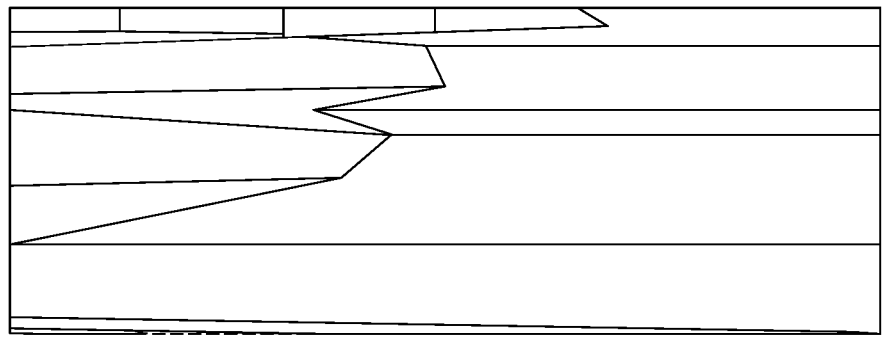
FIG. 22 shows a right side view of the third decorative manufactured block with load-bearing areas and a false joint, in accordance with an example embodiment of the present disclosure.

FIG. 22 shows a right side view of the third decorative manufactured block with load-bearing areas and a false joint, in accordance with an example embodiment of the present disclosure.

Figure 23:
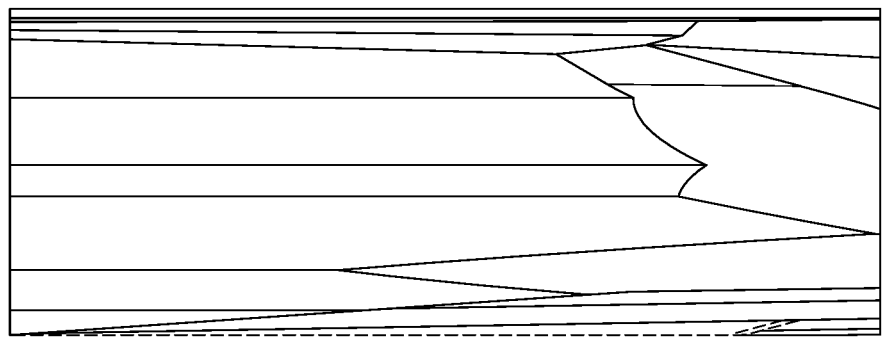
FIG. 23 shows a left side view of the third decorative manufactured block with load-bearing areas and a false joint, in accordance with an example embodiment of the present disclosure.

FIG. 23 shows a left side view of the third decorative manufactured block with load-bearing areas and a false joint, in accordance with an example embodiment of the present disclosure.

Figure 24:
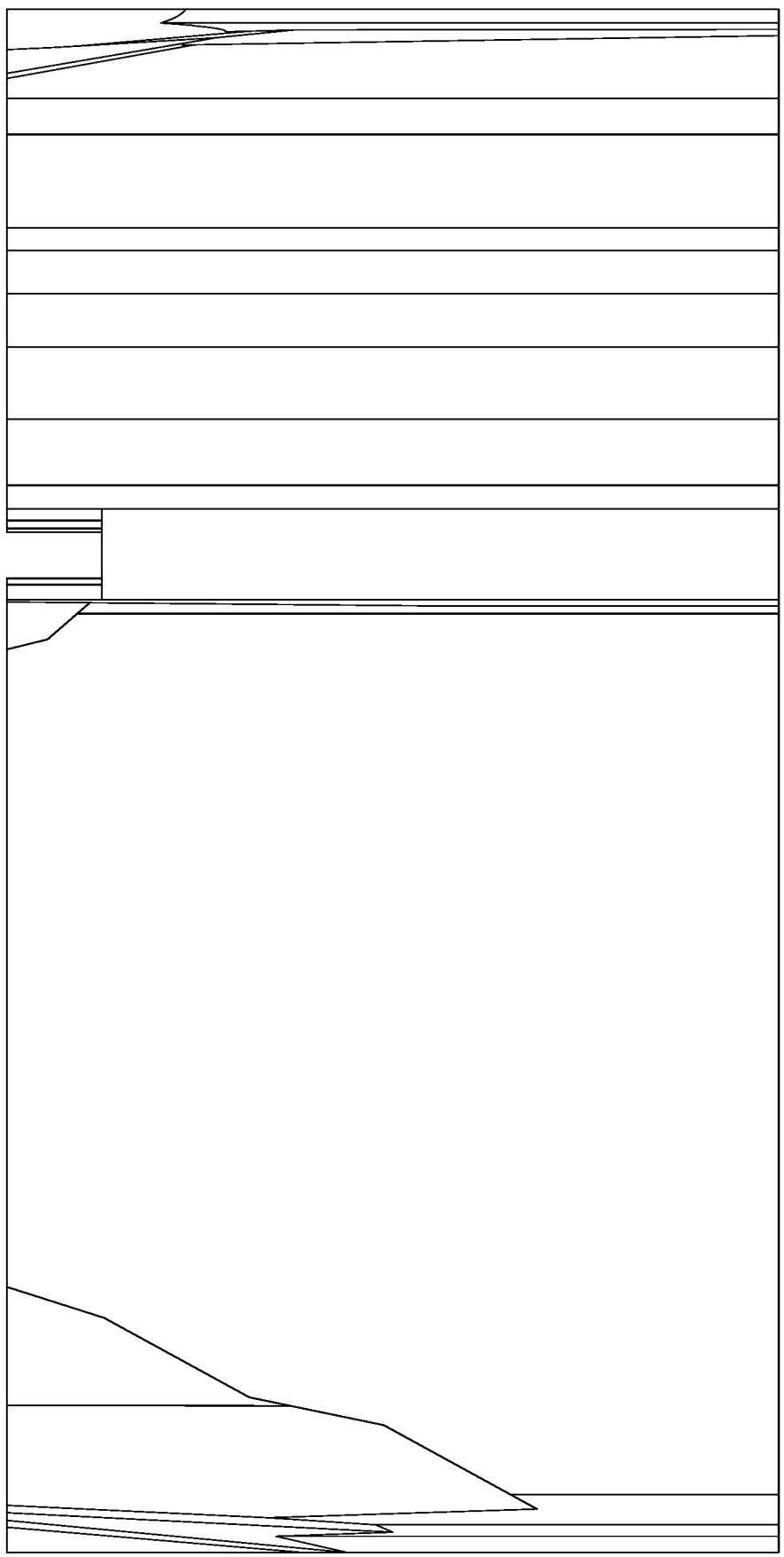
FIG. 24 shows a top view of the third decorative manufactured block with load-bearing areas and a false joint, in accordance with an example embodiment of the present disclosure.

FIG. 24 shows a top view of the third decorative manufactured block with load-bearing areas and a false joint, in accordance with an example embodiment of the present disclosure.

Figure 25:
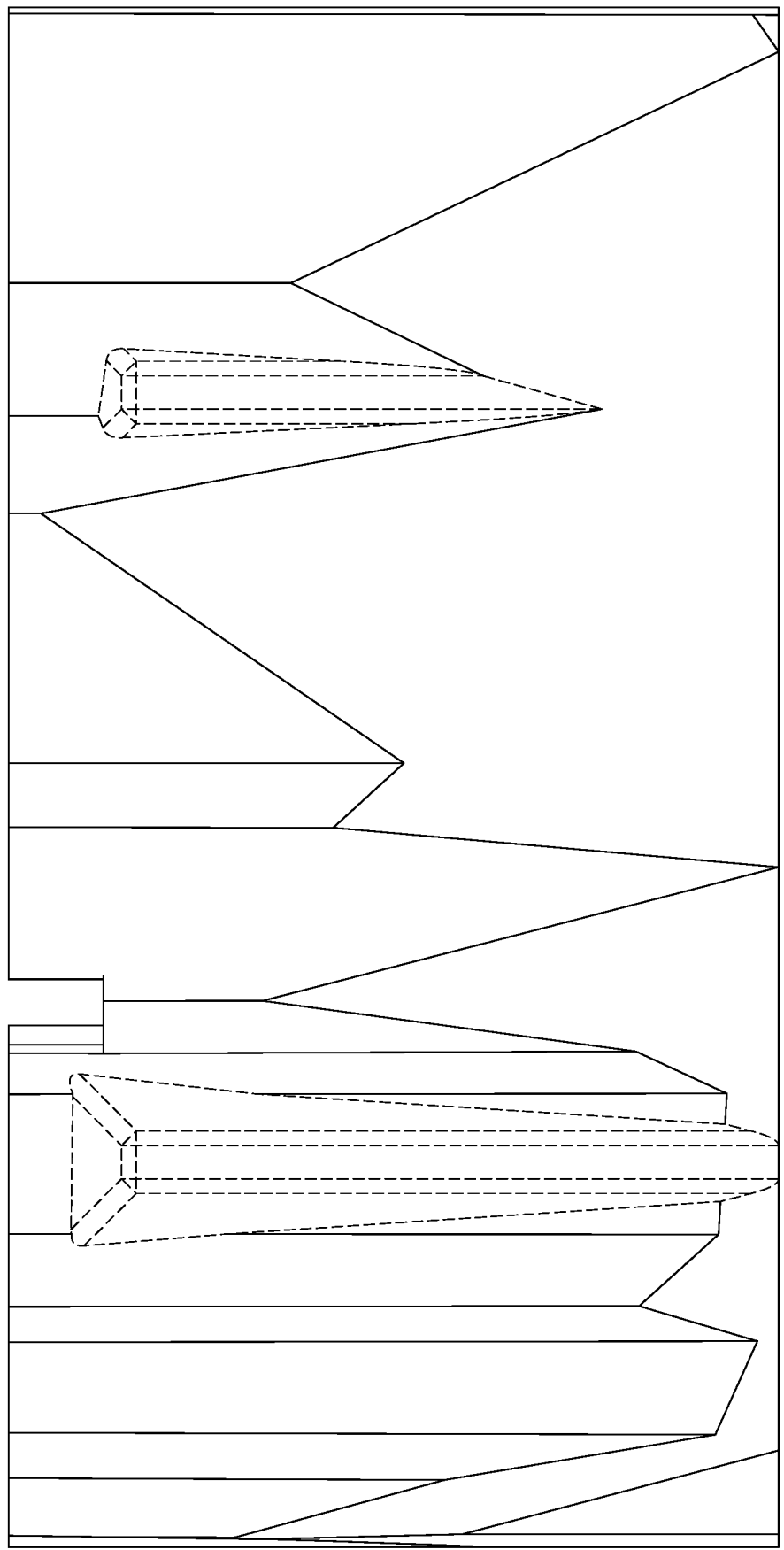
FIG. 25 shows a bottom view of the third decorative manufactured block with load-bearing areas and a false joint, in accordance with an example embodiment of the present disclosure.

FIG. 25 shows a bottom view of the third decorative manufactured block with load-bearing areas and a false joint, in accordance with an example embodiment of the present disclosure. The load-bearing areas are shown with dashed lines, and in application these areas may be further obscured with weathering or other manufacturing processes to hide their appearance, as long as the functionality of the load-bearing area is not altered.

Figure 26:
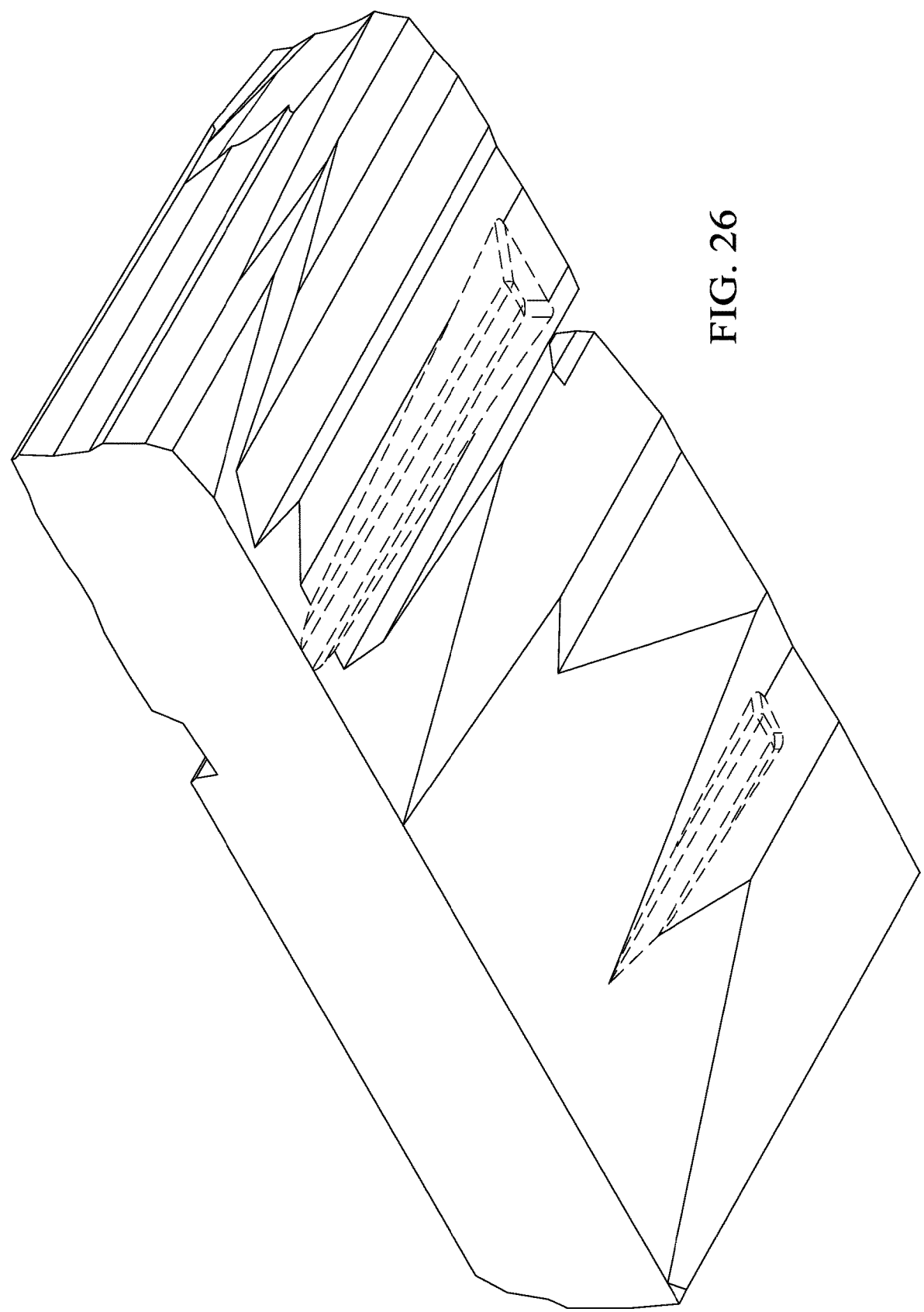
FIG. 26 shows a rear perspective of the third decorative manufactured block with load-bearing areas and a false joint, in accordance with an example embodiment of the present disclosure.

FIG. 26 shows a rear perspective of the third decorative manufactured block with load-bearing areas and a false joint, in accordance with an example embodiment of the present disclosure. The load-bearing area is shown with dashed lines, and in application these areas may be further obscured with weathering or other manufacturing processes to hide their appearance, as long as the functionality of the load-bearing area is not altered.

Figure 27:
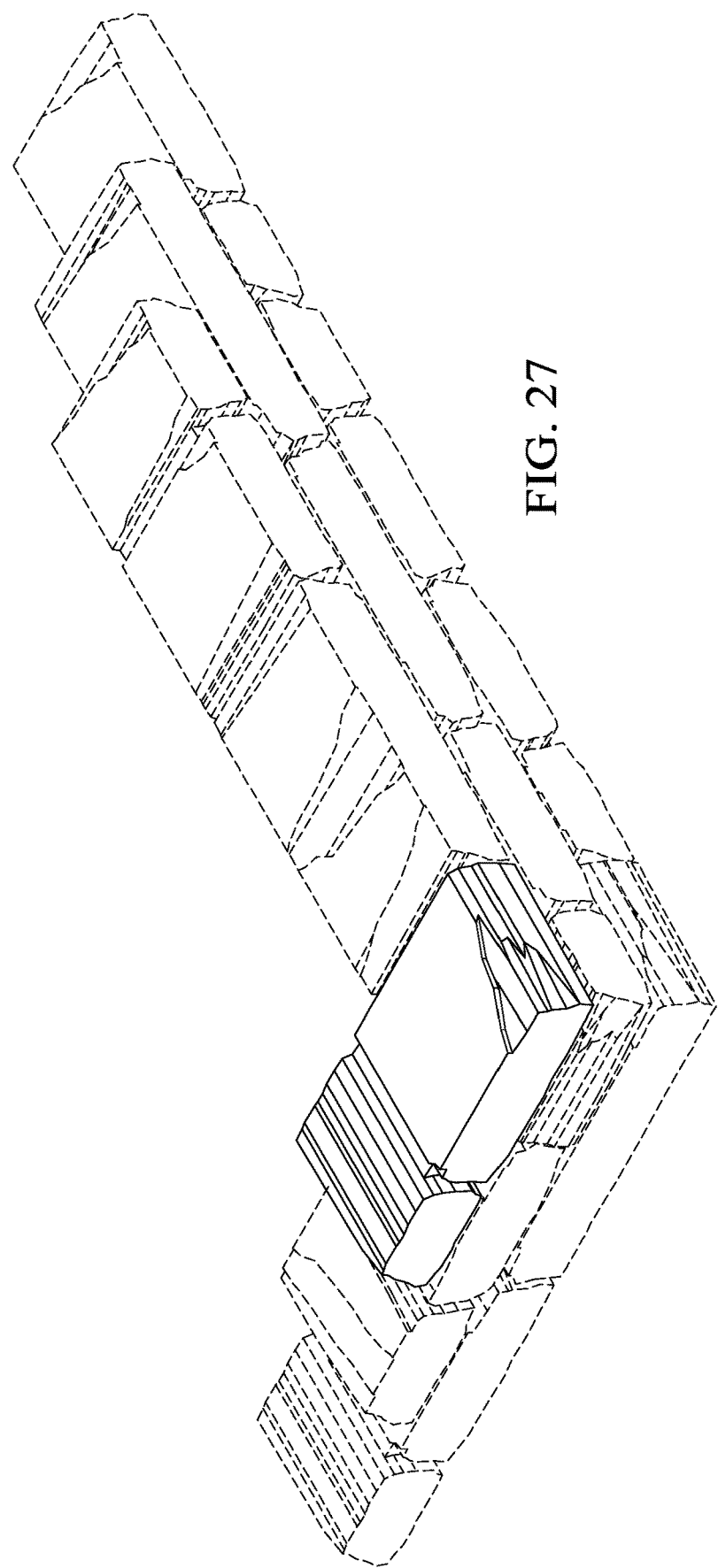
FIG. 27 shows an environmental view of the third decorative manufactured block with load-bearing areas and a false joint, in accordance with an example embodiment of the present disclosure.

FIG. 27 shows an environmental view of the third decorative manufactured block with load-bearing areas and a false joint, in accordance with an example embodiment of the present disclosure.

Figure 28:
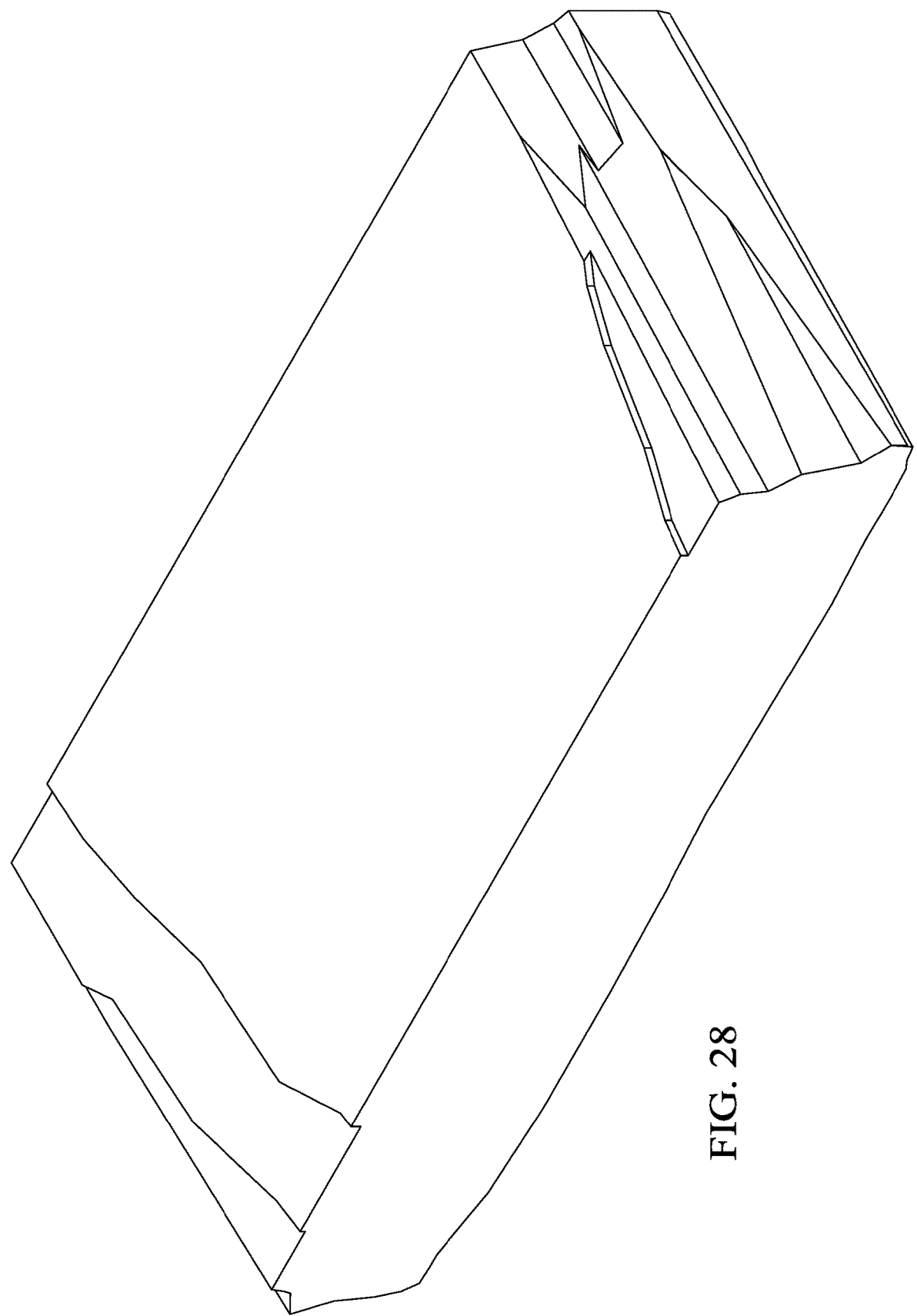
FIG. 28 shows a front perspective of a fourth decorative manufactured block with load-bearing areas, in accordance with an example embodiment of the present disclosure.

FIG. 28 shows a front perspective of a fourth decorative manufactured block with load-bearing areas, in accordance with an example embodiment of the present disclosure.

Figure 29:
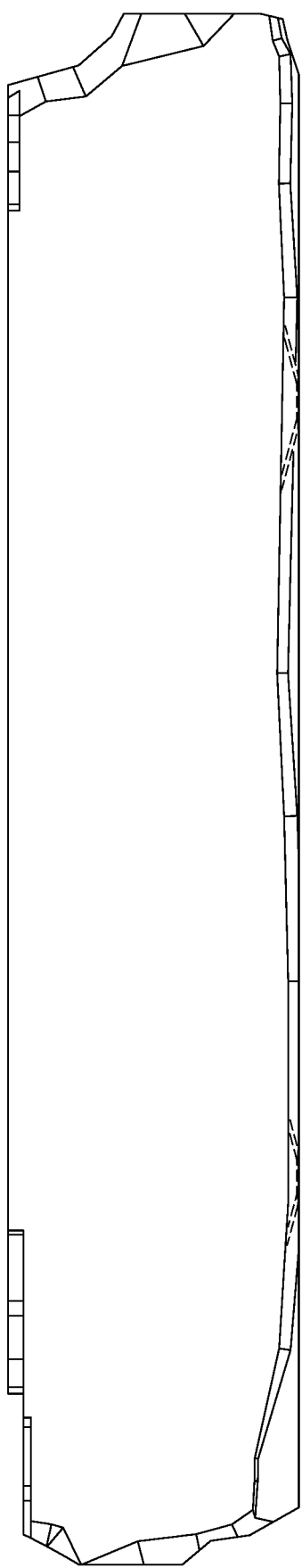
FIG. 29 shows a front elevation view of the fourth decorative manufactured block with load-bearing areas, in accordance with an example embodiment of the present disclosure.

FIG. 29 shows a front elevation view of the fourth decorative manufactured block with load-bearing areas, in accordance with an example embodiment of the present disclosure.

Figure 30:
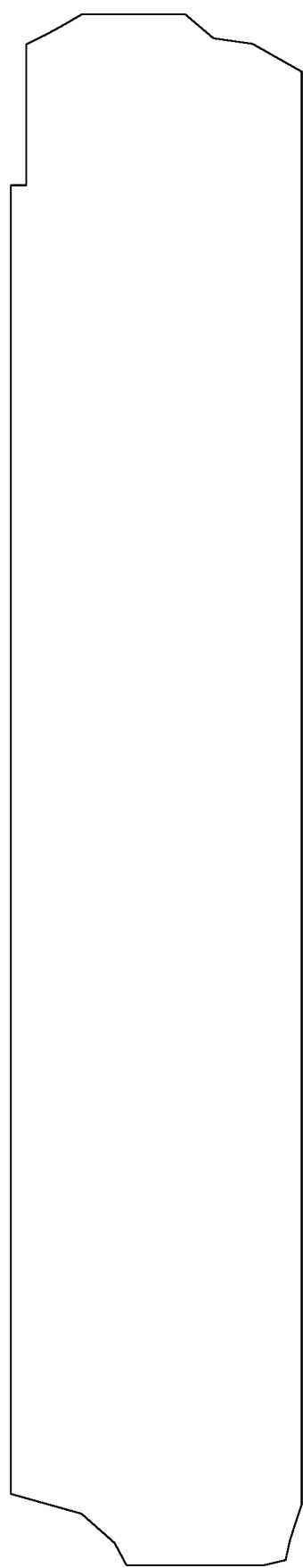
FIG. 30 shows a rear elevation view of the fourth decorative manufactured block with load-bearing areas, in accordance with an example embodiment of the present disclosure.

FIG. 30 shows a rear elevation view of the fourth decorative manufactured block with load-bearing areas, in accordance with an example embodiment of the present disclosure.

Figure 31:
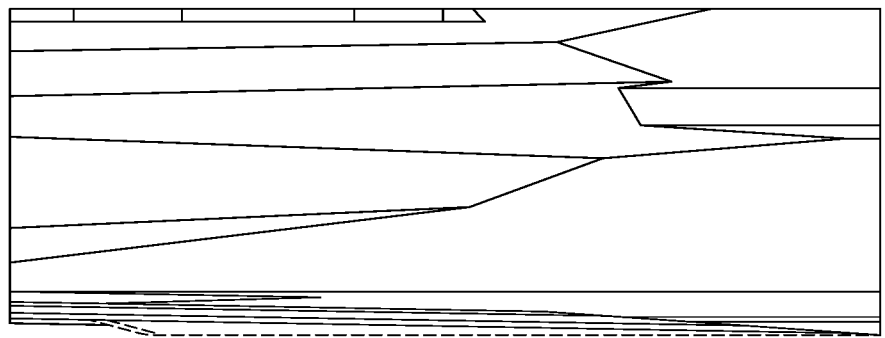
FIG. 31 shows a right side view of the fourth decorative manufactured block with load-bearing areas, in accordance with an example embodiment of the present disclosure.

FIG. 31 shows a right side view of the fourth decorative manufactured block with load-bearing areas, in accordance with an example embodiment of the present disclosure.

Figure 32:
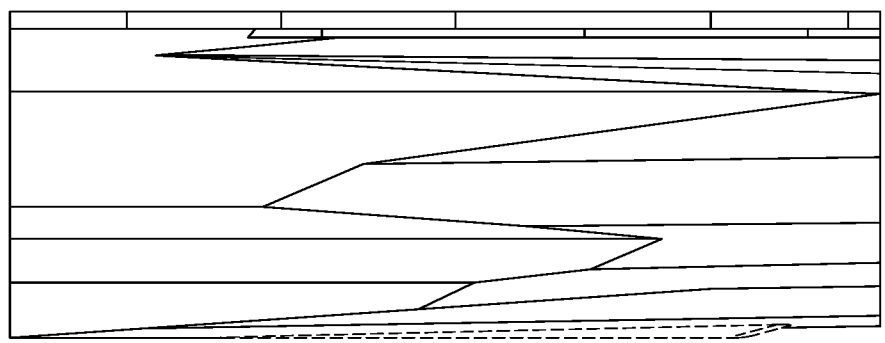
FIG. 32 shows a left side view of the fourth decorative manufactured block with load-bearing areas, in accordance with an example embodiment of the present disclosure.

FIG. 32 shows a left side view of the fourth decorative manufactured block with load-bearing areas, in accordance with an example embodiment of the present disclosure.

Figure 33:
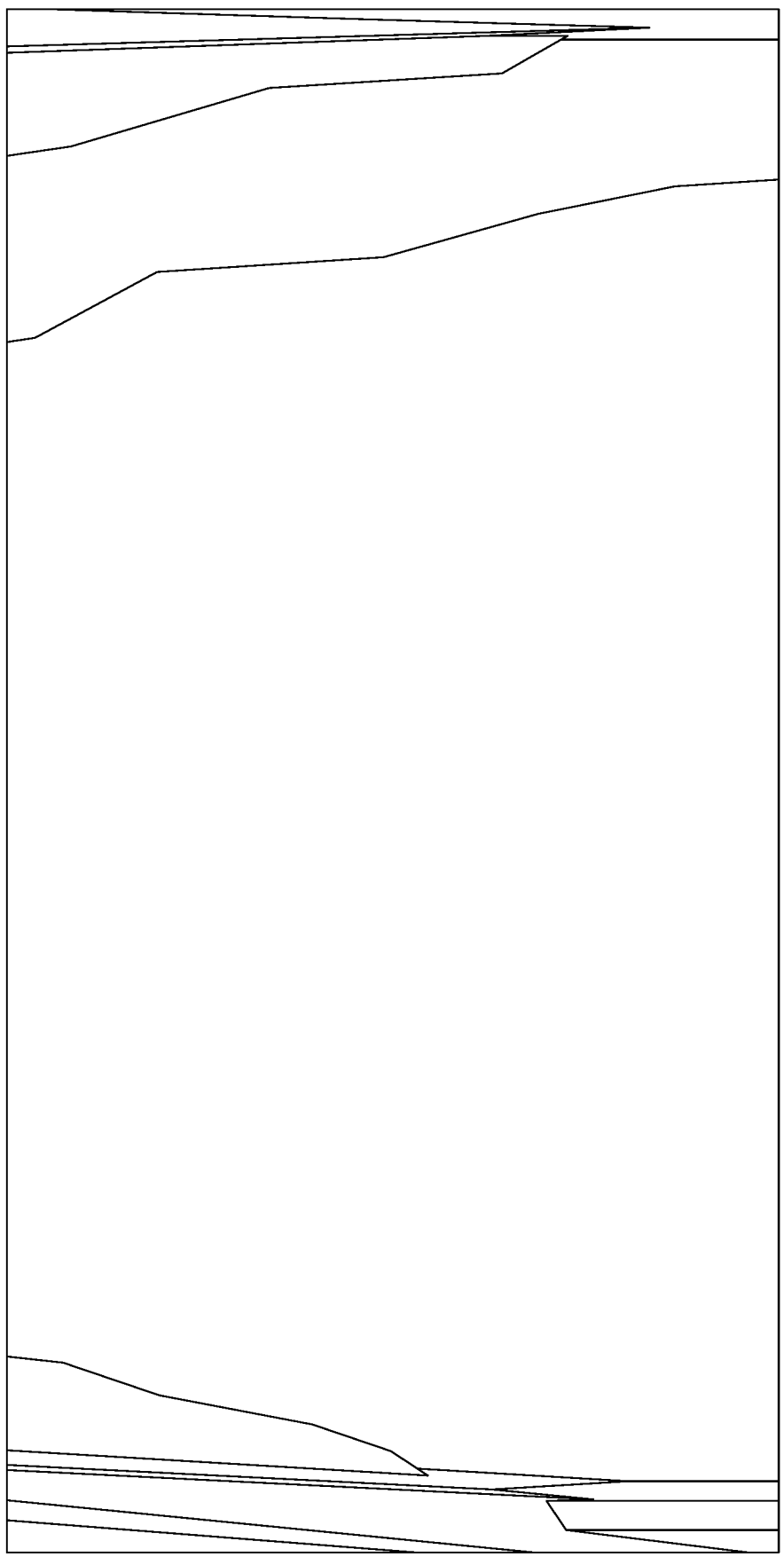
FIG. 33 shows a top view of the fourth decorative manufactured block with load-bearing areas, in accordance with an example embodiment of the present disclosure.

FIG. 33 shows a top view of the fourth decorative manufactured block with load-bearing areas, in accordance with an example embodiment of the present disclosure.

Figure 34:
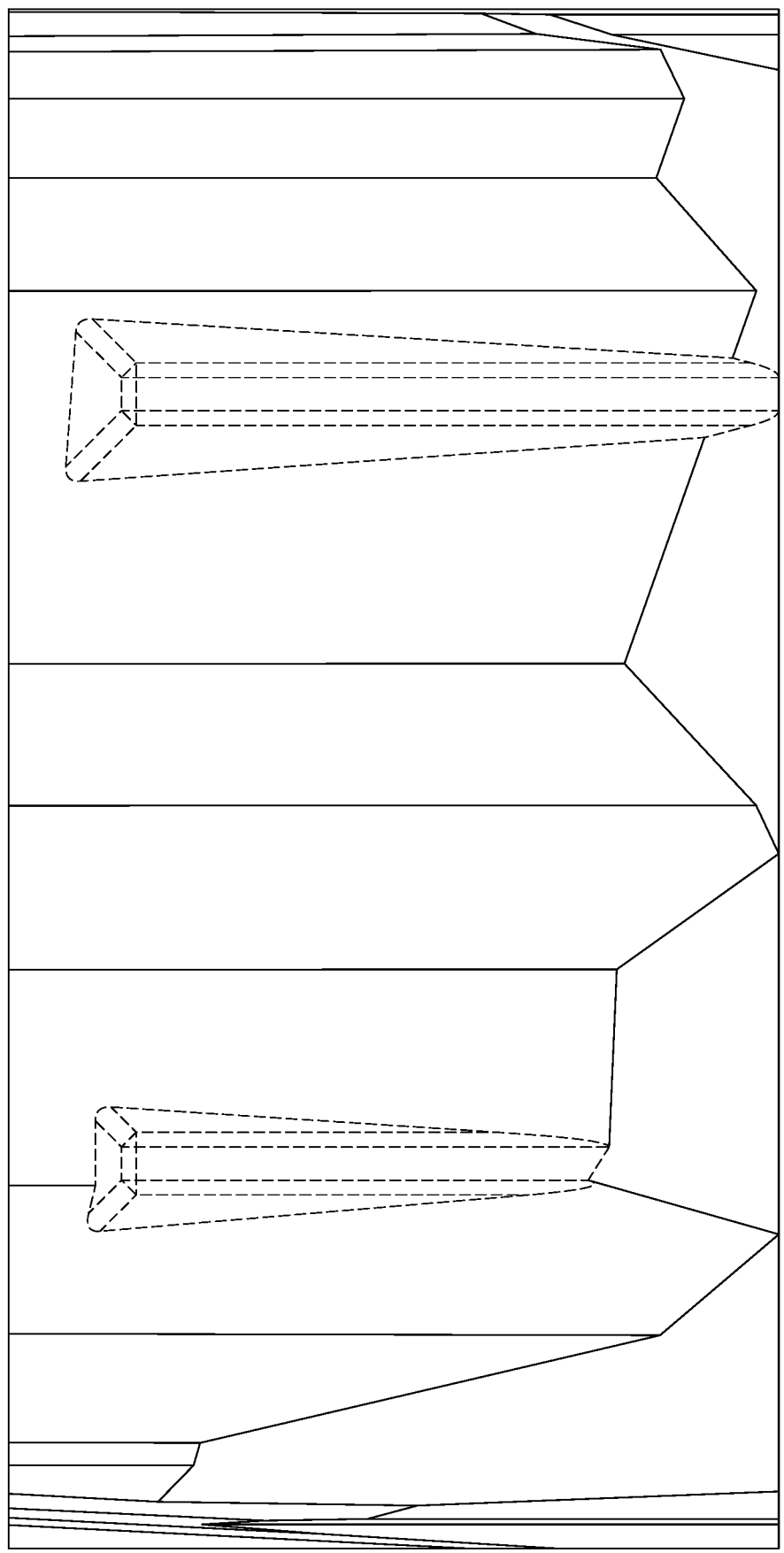
FIG. 34 shows a bottom view of the fourth decorative manufactured block with load-bearing areas, in accordance with an example embodiment of the present disclosure.

FIG. 34 shows a bottom view of the fourth decorative manufactured block with load-bearing areas, in accordance with an example embodiment of the present disclosure. The load-bearing areas are shown with dashed lines, and in application these areas may be further obscured with weathering or other manufacturing processes to hide their appearance, as long as the functionality of the load-bearing area is not altered.

Figure 35:
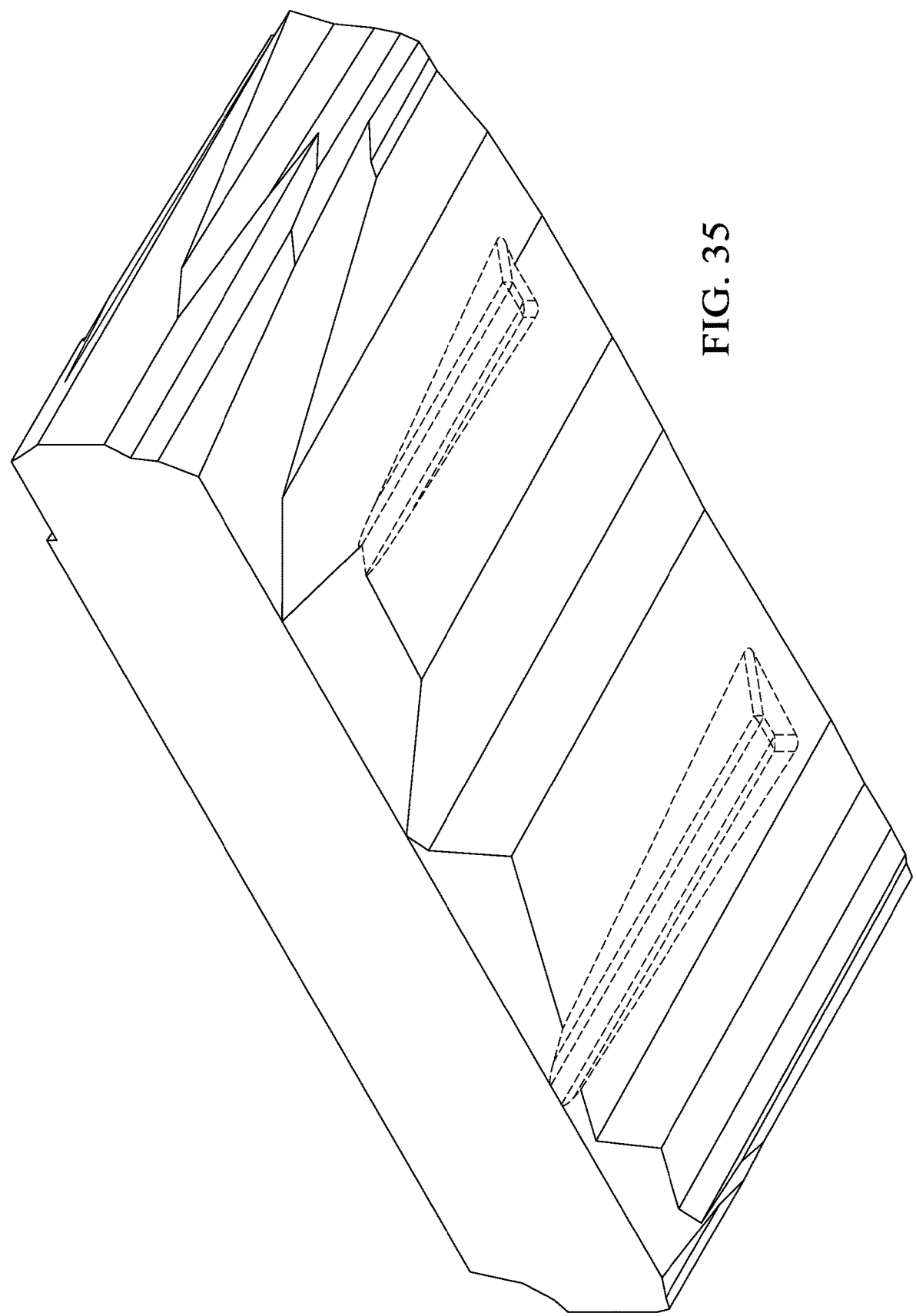
FIG. 35 shows a rear perspective of the fourth decorative manufactured block with load-bearing areas, in accordance with an example embodiment of the present disclosure.

FIG. 35 shows a rear perspective of the fourth decorative manufactured block with load-bearing areas, in accordance with an example embodiment of the present disclosure. The load-bearing areas are shown with dashed lines, and in application these areas may be further obscured with weathering or other manufacturing processes to hide their appearance, as long as the functionality of the load-bearing area is not altered.

Figure 36:
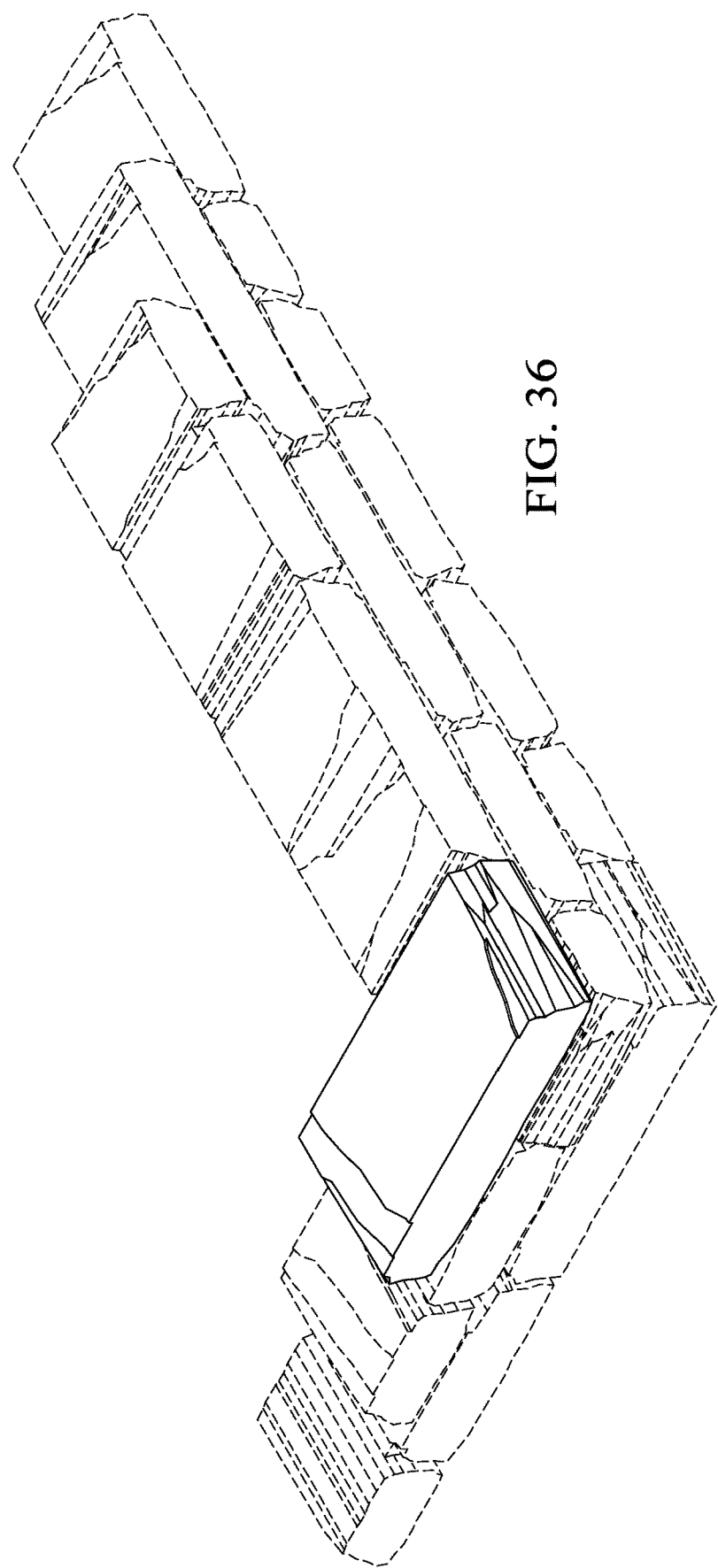
FIG. 36 shows an environmental view of the fourth decorative manufactured block with load-bearing areas, in accordance with an example embodiment of the present disclosure.

FIG. 36 shows an environmental view of the fourth decorative manufactured block with load-bearing areas, in accordance with an example embodiment of the present disclosure.

Figure 37:
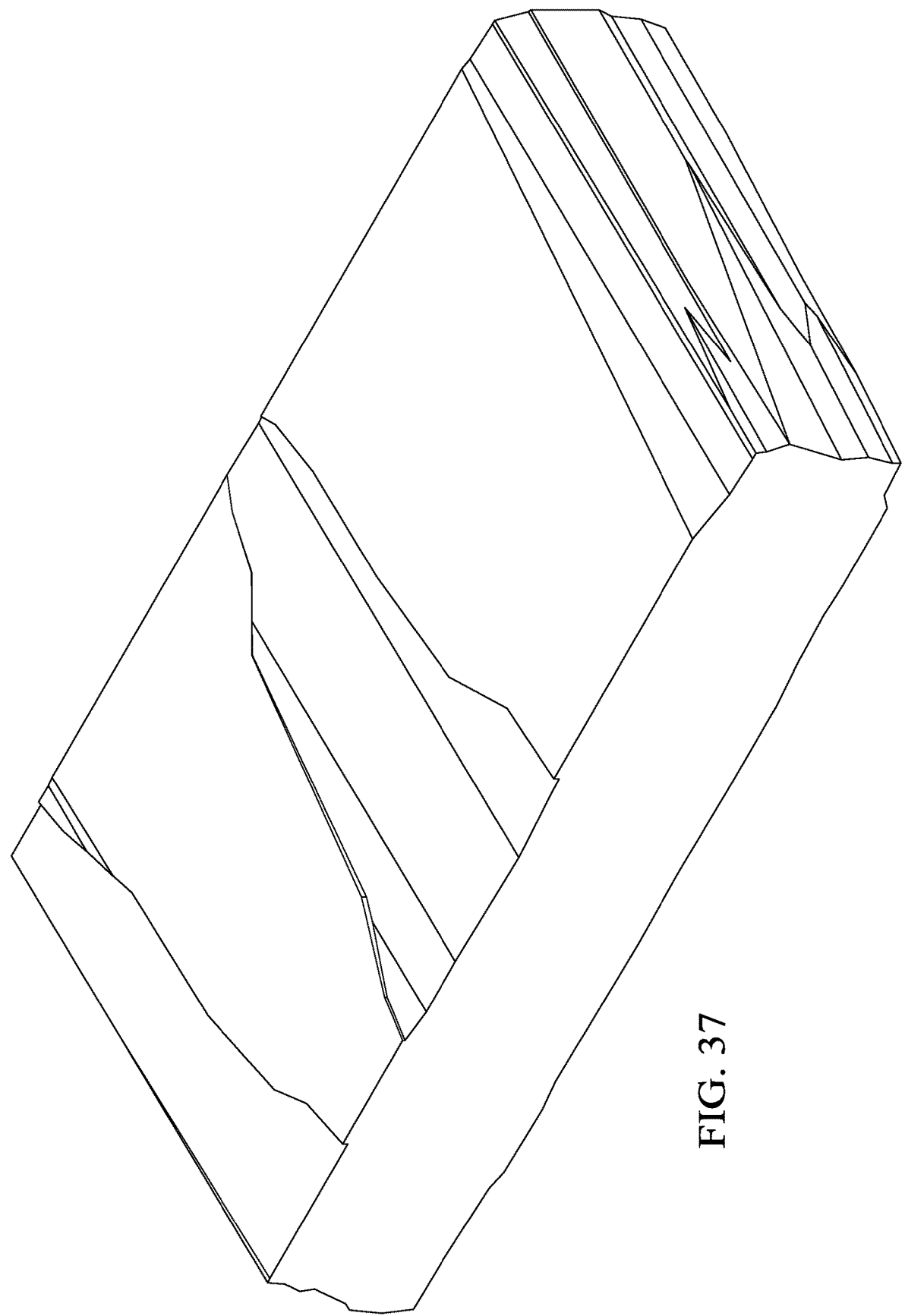
FIG. 37 shows a front perspective of a fifth decorative manufactured block with load-bearing areas, in accordance with an example embodiment of the present disclosure.

FIG. 37 shows a front perspective of a fifth decorative manufactured block with load-bearing areas, in accordance with an example embodiment of the present disclosure.

Figure 38:
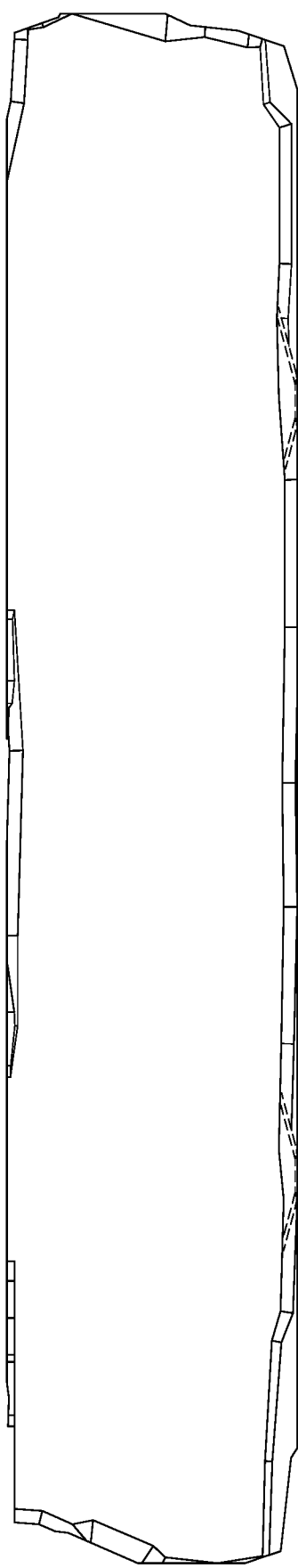
FIG. 38 shows a front elevation view of the fifth decorative manufactured block with load-bearing areas, in accordance with an example embodiment of the present disclosure.

FIG. 38 shows a front elevation view of the fifth decorative manufactured block with load-bearing areas, in accordance with an example embodiment of the present disclosure.

Figure 39:
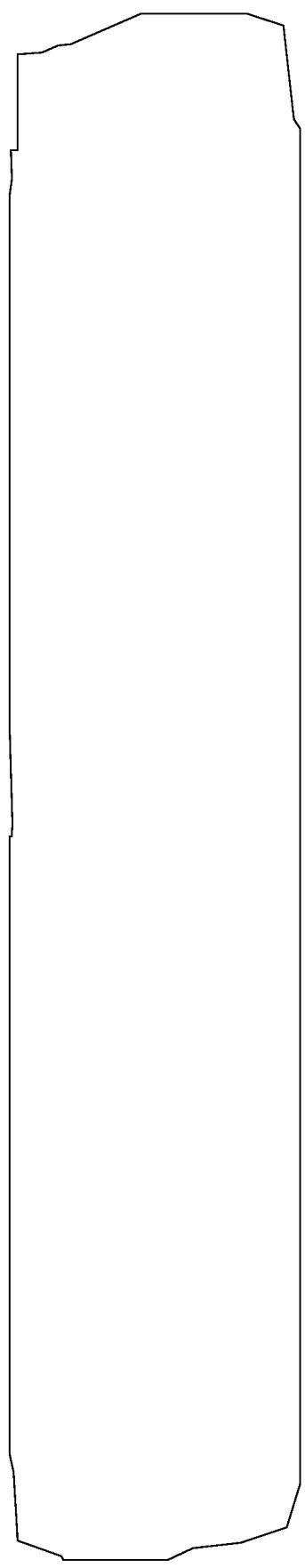
FIG. 39 shows a rear elevation view of the fifth decorative manufactured block with load-bearing areas, in accordance with an example embodiment of the present disclosure.

FIG. 39 shows a rear elevation view of the fifth decorative manufactured block with load-bearing areas, in accordance with an example embodiment of the present disclosure.

Figure 40:
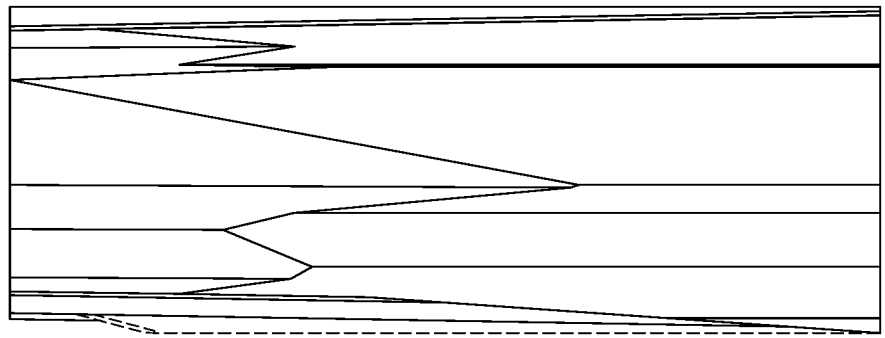
FIG. 40 shows a right side view of the fifth decorative manufactured block with load-bearing areas, in accordance with an example embodiment of the present disclosure.

FIG. 40 shows a right side view of the fifth decorative manufactured block with load-bearing areas, in accordance with an example embodiment of the present disclosure.

Figure 41:
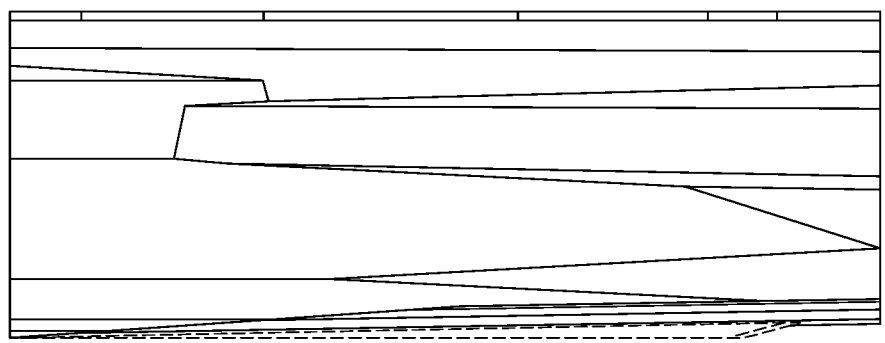
FIG. 41 shows a left side view of the fifth decorative manufactured block with load-bearing areas, in accordance with an example embodiment of the present disclosure.

FIG. 41 shows a left side view of the fifth decorative manufactured block with load-bearing areas, in accordance with an example embodiment of the present disclosure.

Figure 42:
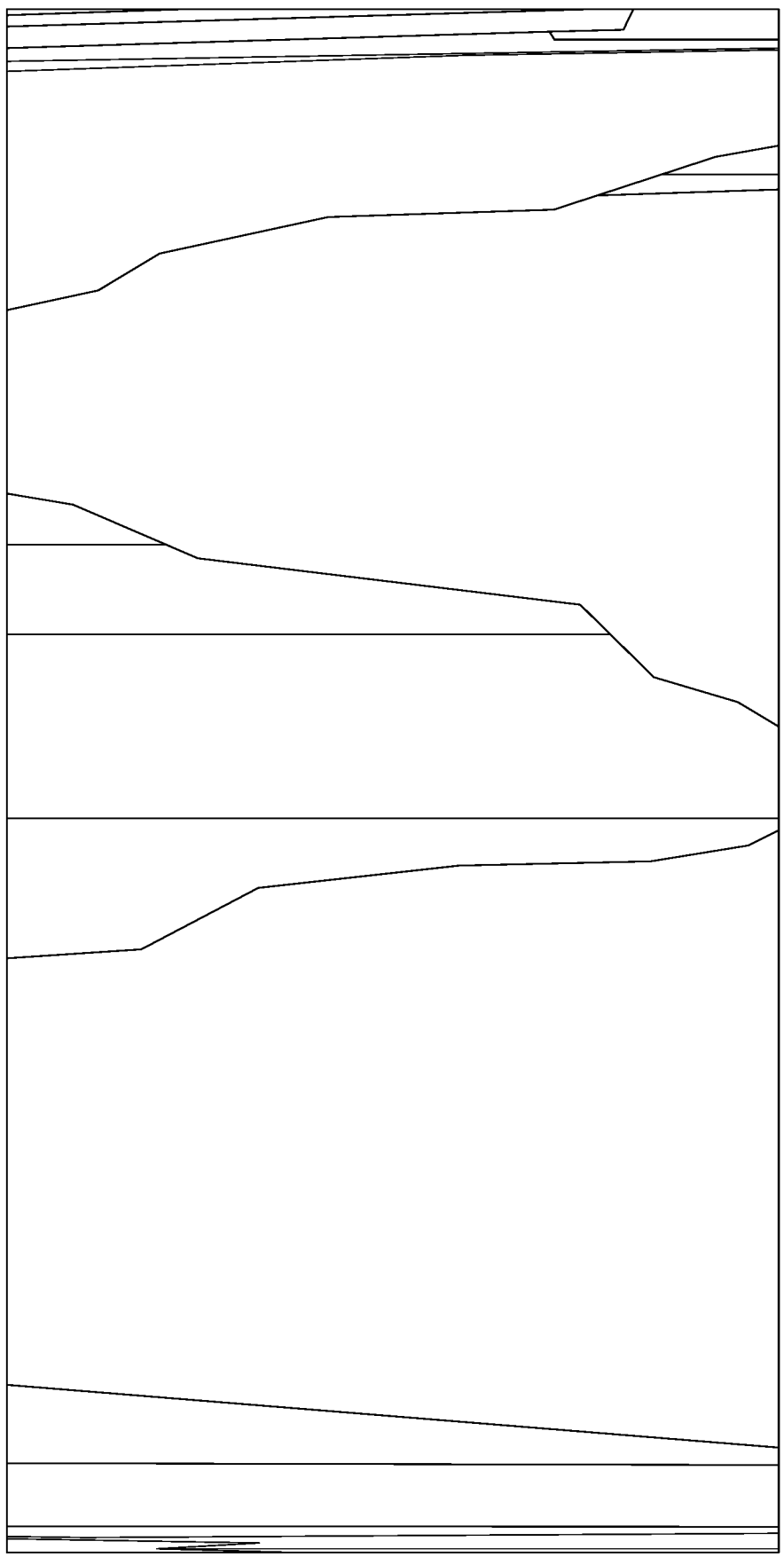
FIG. 42 shows a top view of the fifth decorative manufactured block with load-bearing areas, in accordance with an example embodiment of the present disclosure.

FIG. 42 shows a top view of the fifth decorative manufactured block with load-bearing areas, in accordance with an example embodiment of the present disclosure.

Figure 43:
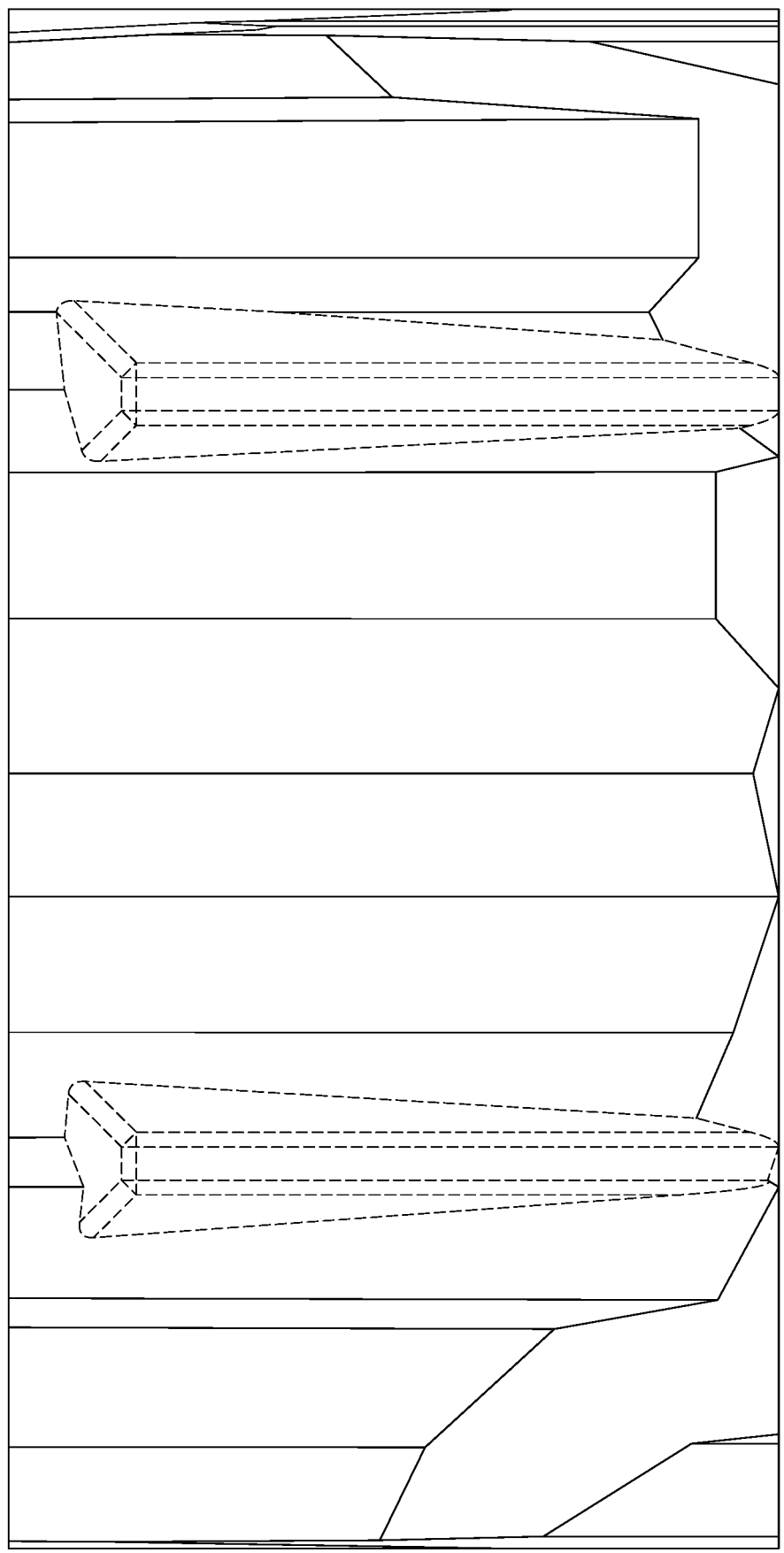
FIG. 43 shows a bottom view of the fifth decorative manufactured block with load-bearing areas, in accordance with an example embodiment of the present disclosure.

FIG. 43 shows a bottom view of the fifth decorative manufactured block with load-bearing areas, in accordance with an example embodiment of the present disclosure. The load-bearing areas are shown with dashed lines, and in application these areas may be further obscured with weathering or other manufacturing processes to hide their appearance, as long as the functionality of the load-bearing area is not altered.

Figure 44:
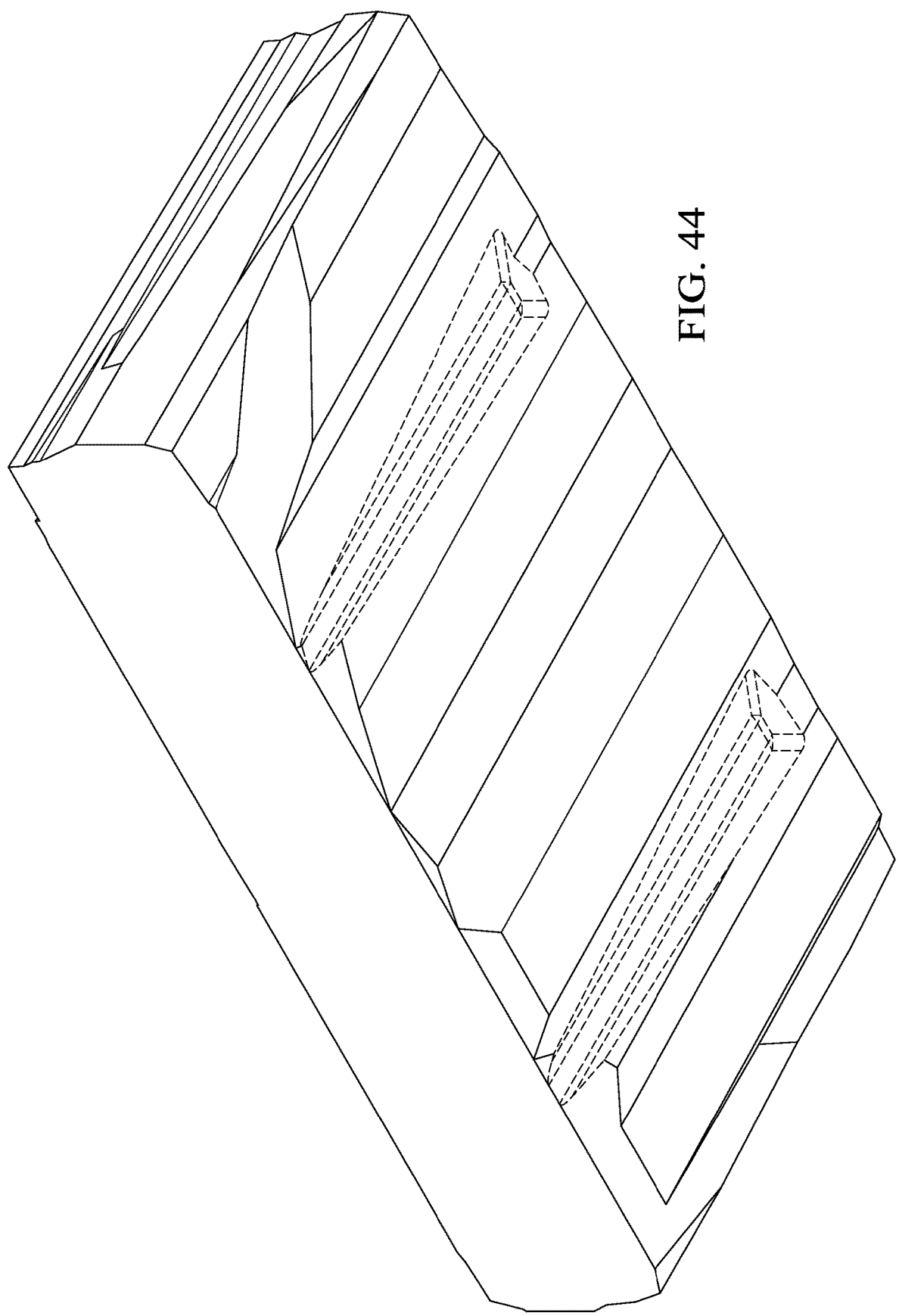
FIG. 44 shows a rear perspective of the fifth decorative manufactured block with load-bearing areas, in accordance with an example embodiment of the present disclosure.

FIG. 44 shows a rear perspective of the fifth decorative manufactured block with load-bearing areas, in accordance with an example embodiment of the present disclosure. The load-bearing areas are shown with dashed lines, and in application these areas may be further obscured with weathering or other manufacturing processes to hide their appearance, as long as the functionality of the load-bearing area is not altered.

Figure 45:
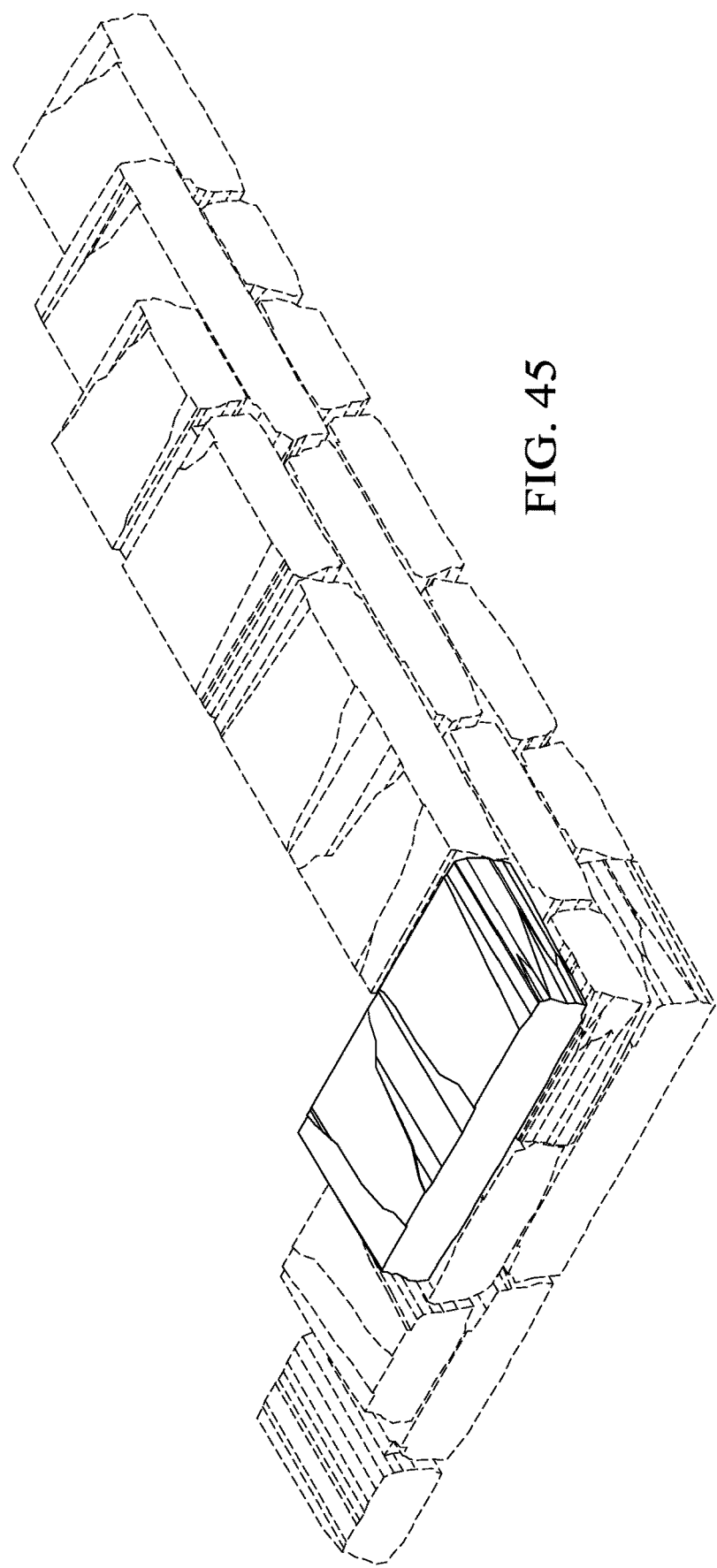
FIG. 45 shows an environmental view of the fifth decorative manufactured block with load-bearing areas, in accordance with an example embodiment of the present disclosure.

FIG. 45 shows an environmental view of the fifth decorative manufactured block with load-bearing areas, in accordance with an example embodiment of the present disclosure.

Figure 46:
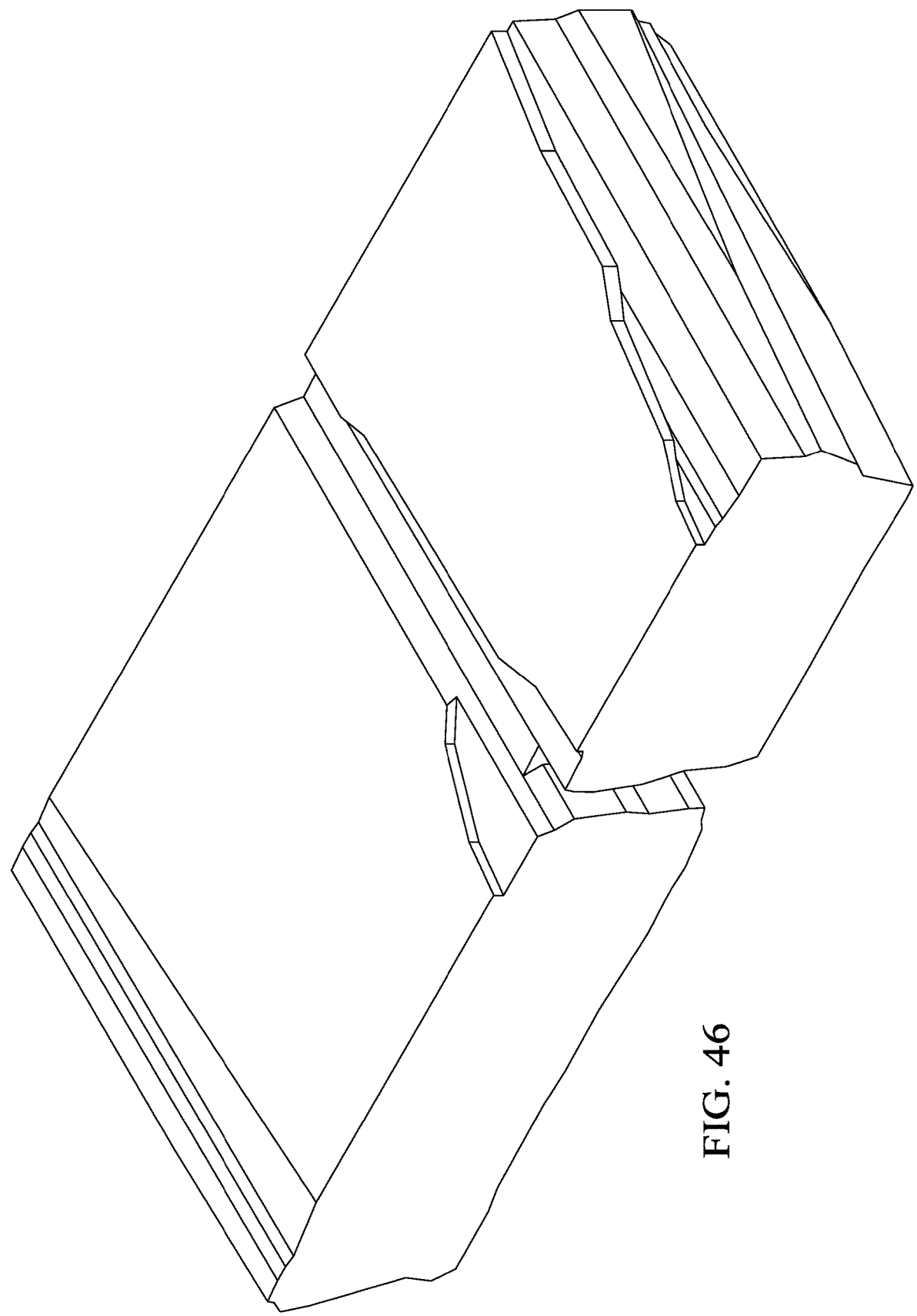
FIG. 46 shows a front perspective of a sixth decorative manufactured block with load-bearing areas and a false joint, in accordance with an example embodiment of the present disclosure.

FIG. 46 shows a front perspective of a sixth decorative manufactured block with load-bearing areas and a false joint, in accordance with an example embodiment of the present disclosure.

Figure 47:
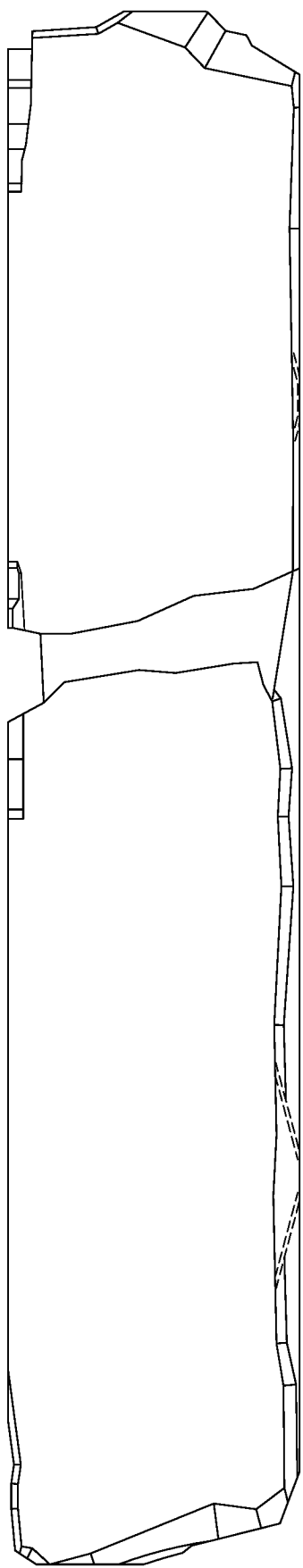
FIG. 47 shows a front elevation view of the sixth decorative manufactured block with load-bearing areas and a false joint, in accordance with an example embodiment of the present disclosure.

FIG. 47 shows a front elevation view of the sixth decorative manufactured block with load-bearing areas and a false joint, in accordance with an example embodiment of the present disclosure.

Figure 48:
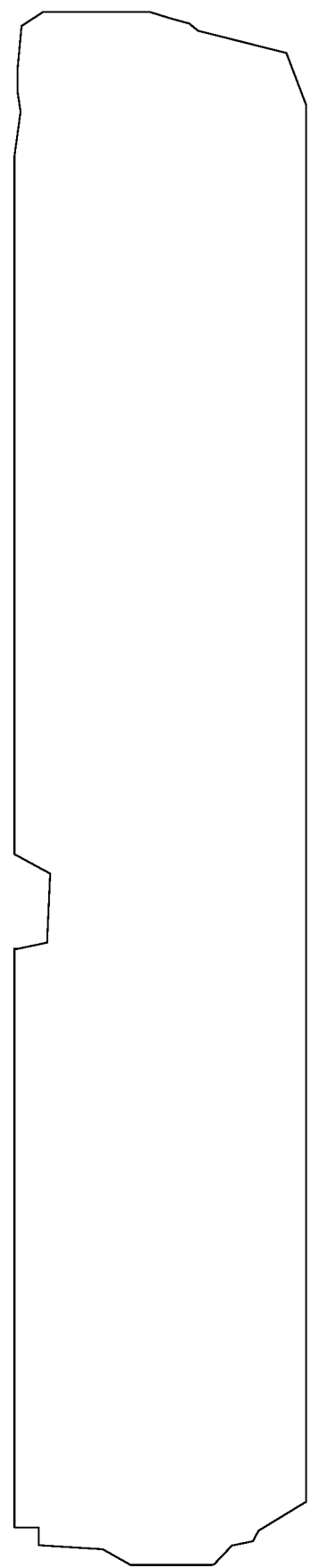
FIG. 48 shows a rear elevation view of the sixth decorative manufactured block with load-bearing areas and a false joint, in accordance with an example embodiment of the present disclosure.

FIG. 48 shows a rear elevation view of the sixth decorative manufactured block with load-bearing areas and a false joint, in accordance with an example embodiment of the present disclosure.

Figure 49:
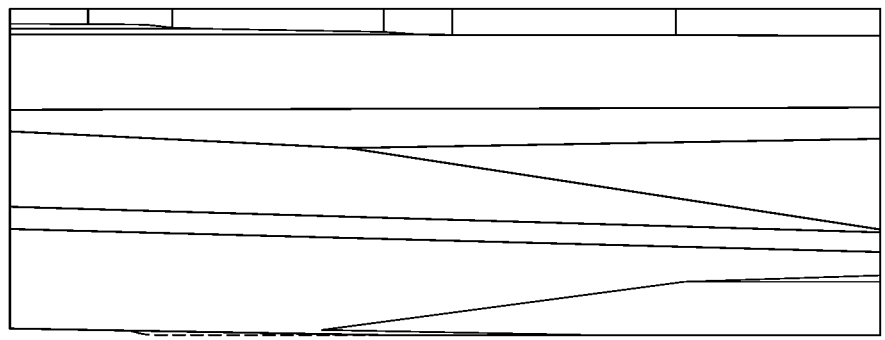
FIG. 49 shows a right side view of the sixth decorative manufactured block with load-bearing areas and a false joint, in accordance with an example embodiment of the present disclosure.

FIG. 49 shows a right side view of the sixth decorative manufactured block with load-bearing areas and a false joint, in accordance with an example embodiment of the present disclosure.

Figure 50:
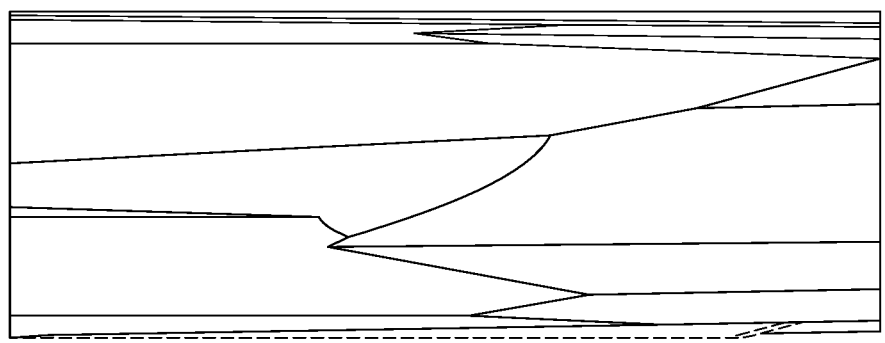
FIG. 50 shows a left side view of the sixth decorative manufactured block with load-bearing areas and a false joint, in accordance with an example embodiment of the present disclosure.

FIG. 50 shows a left side view of the sixth decorative manufactured block with load-bearing areas and a false joint, in accordance with an example embodiment of the present disclosure.

Figure 51:
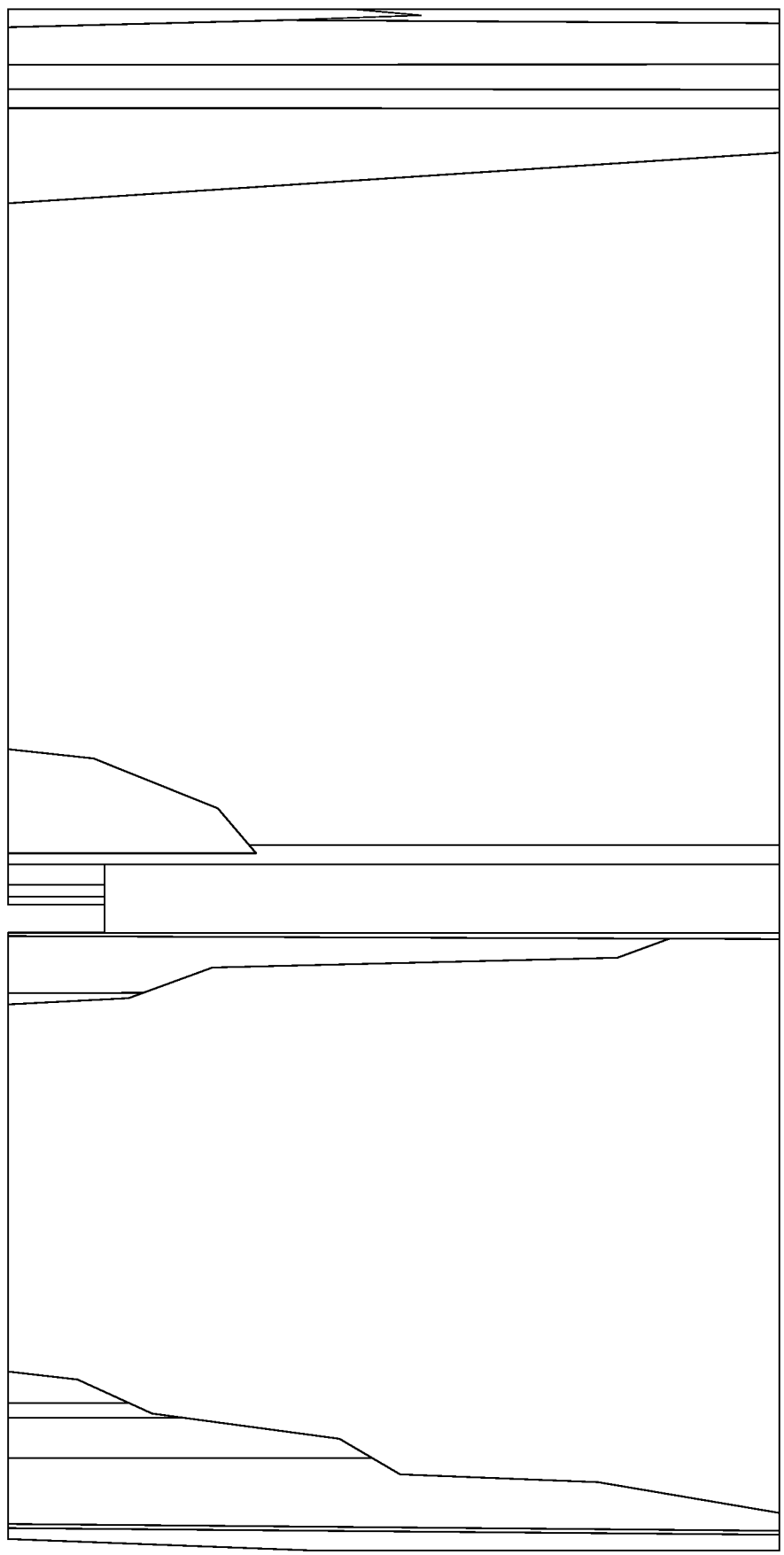
FIG. 51 shows a top view of the sixth decorative manufactured block with load-bearing areas and a false joint, in accordance with an example embodiment of the present disclosure.

FIG. 51 shows a top view of the sixth decorative manufactured block with load-bearing areas and a false joint, in accordance with an example embodiment of the present disclosure.

Figure 52:
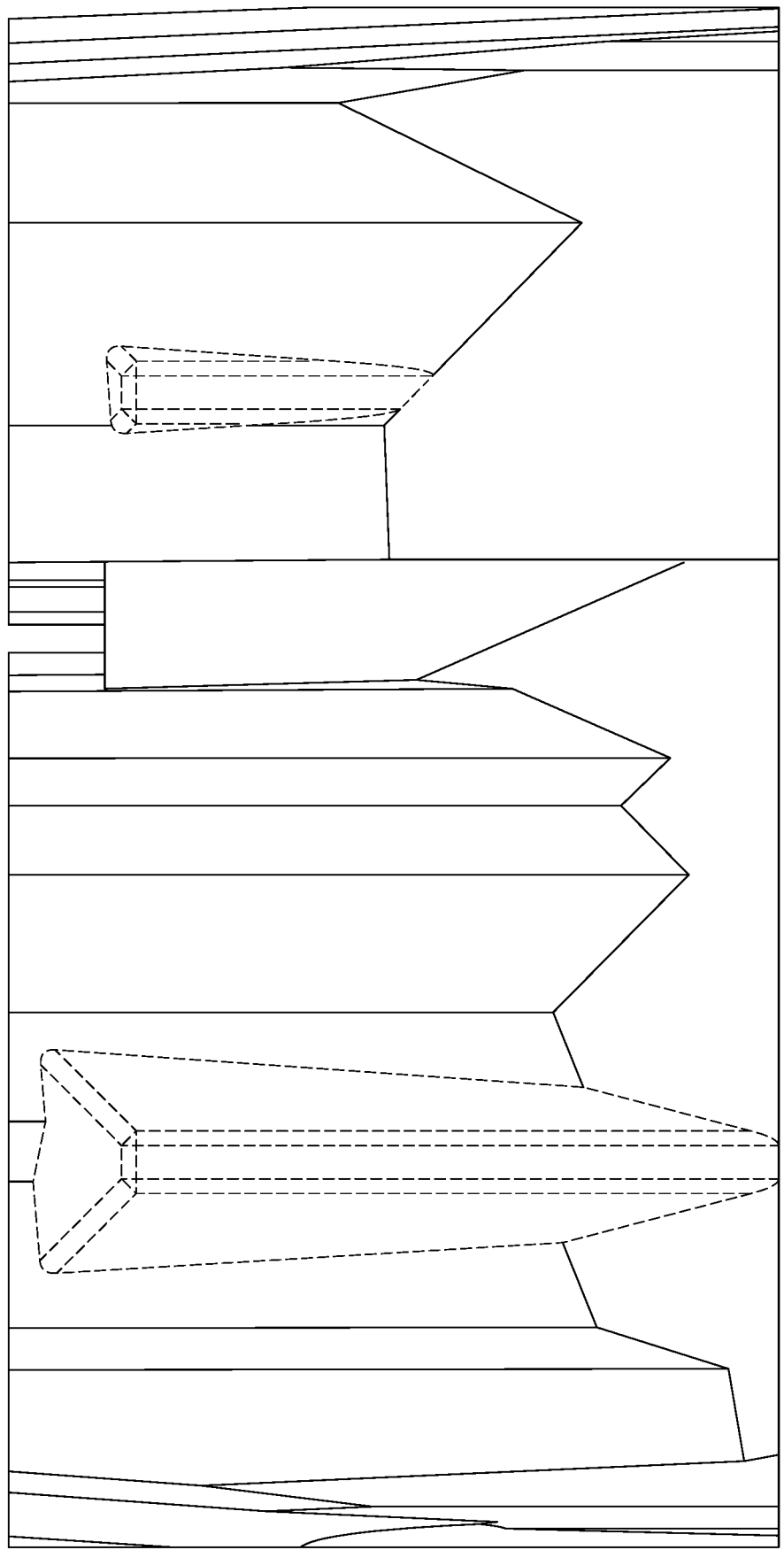
FIG. 52 shows a bottom view of the sixth decorative manufactured block with load-bearing areas and a false joint, in accordance with an example embodiment of the present disclosure.

FIG. 52 shows a bottom view of the sixth decorative manufactured block with load-bearing areas and a false joint, in accordance with an example embodiment of the present disclosure. The load-bearing areas are shown with dashed lines, and in application these areas may be further obscured with weathering or other manufacturing processes to hide their appearance, as long as the functionality of the load-bearing area is not altered.

Figure 53:
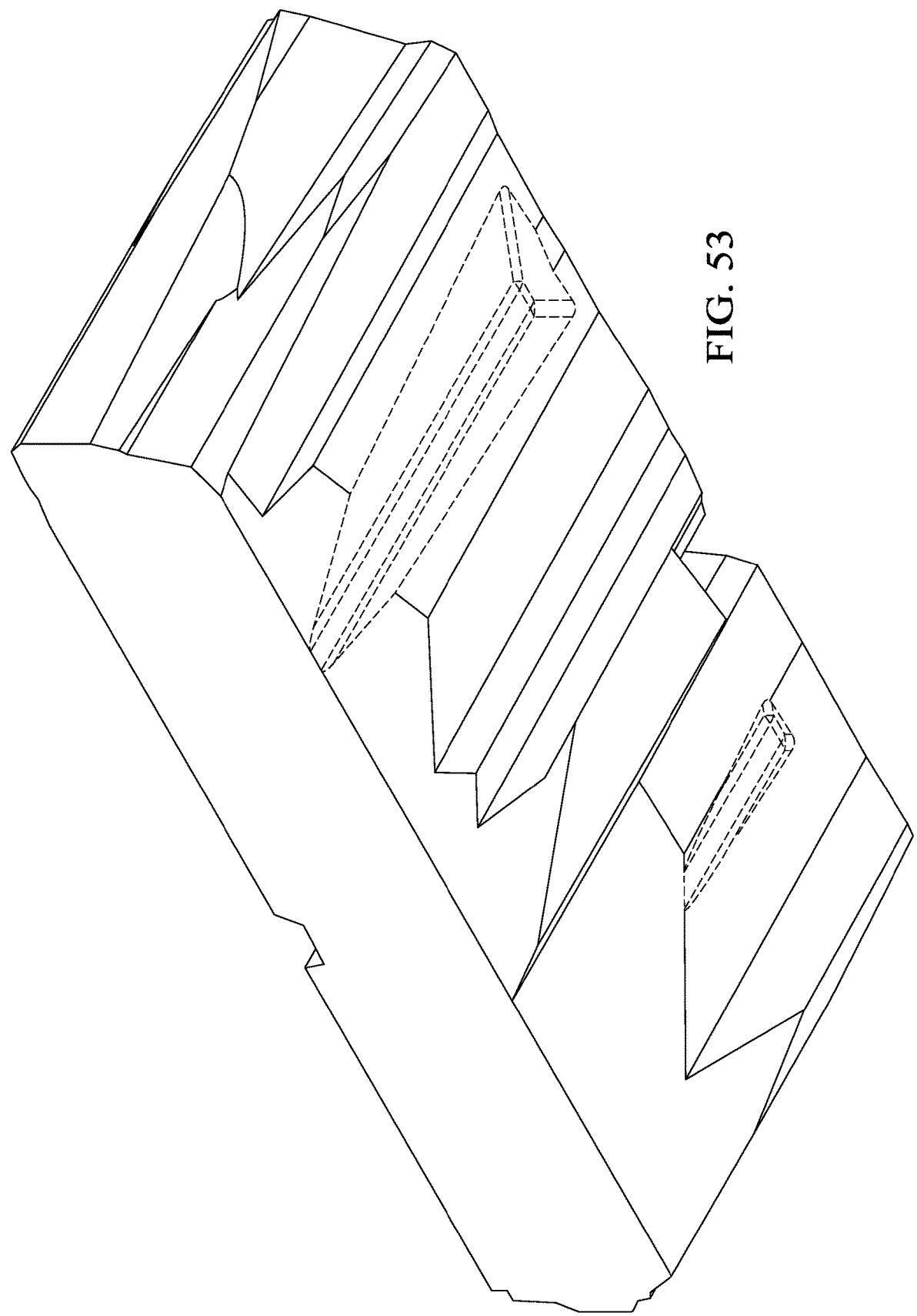
FIG. 53 shows a rear perspective of the sixth decorative manufactured block with load-bearing areas and a false joint, in accordance with an example embodiment of the present disclosure.

FIG. 53 shows a rear perspective of the sixth decorative manufactured block with load-bearing areas and a false joint, in accordance with an example embodiment of the present disclosure. The load-bearing areas are shown with dashed lines, and in application these areas may be further obscured with weathering or other manufacturing processes to hide their appearance, as long as the functionality of the load-bearing area is not altered.

Figure 54:
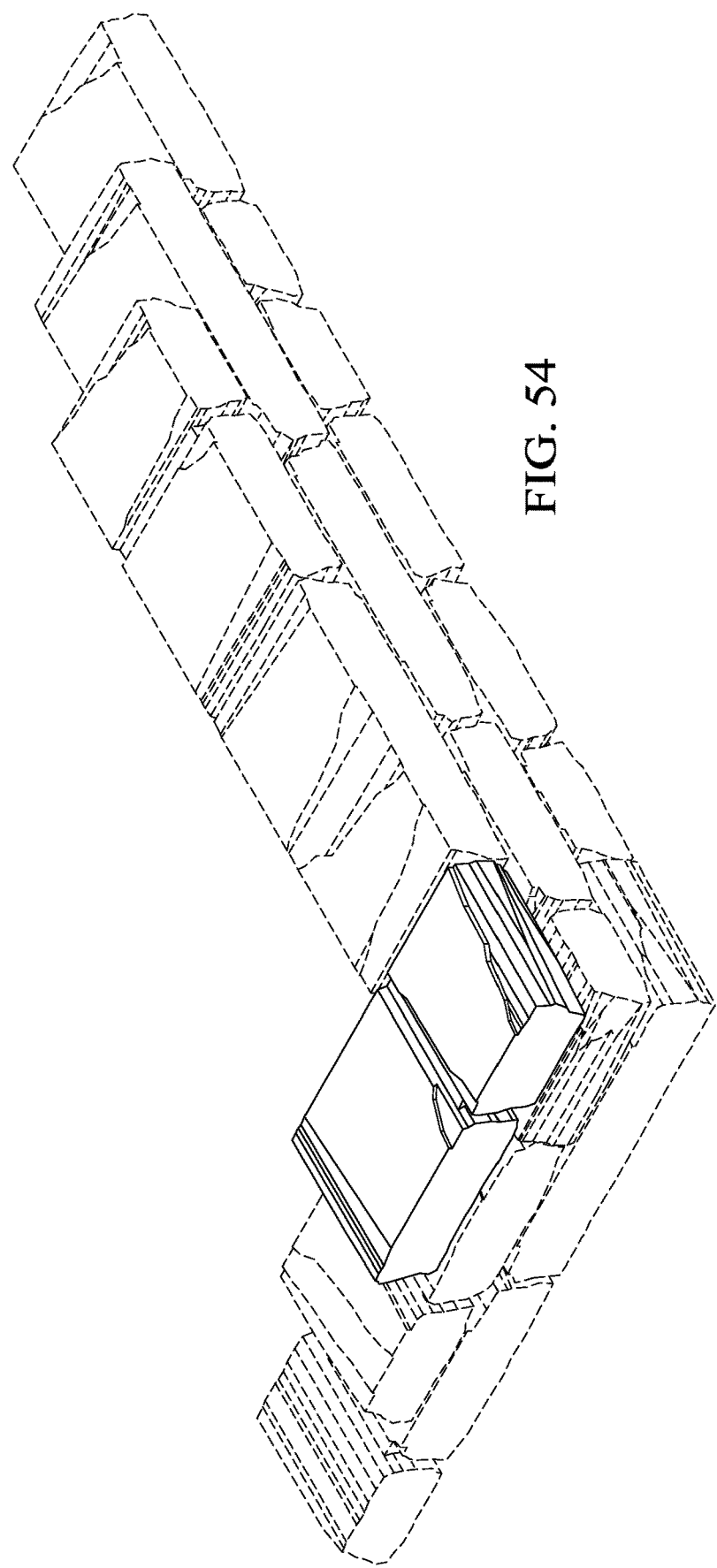
FIG. 54 shows an environmental view of the sixth decorative manufactured block with load-bearing areas and a false joint, in accordance with an example embodiment of the present disclosure.

FIG. 54 shows an environmental view of the sixth decorative manufactured block with load-bearing areas and a false joint, in accordance with an example embodiment of the present disclosure.

Figure 55:
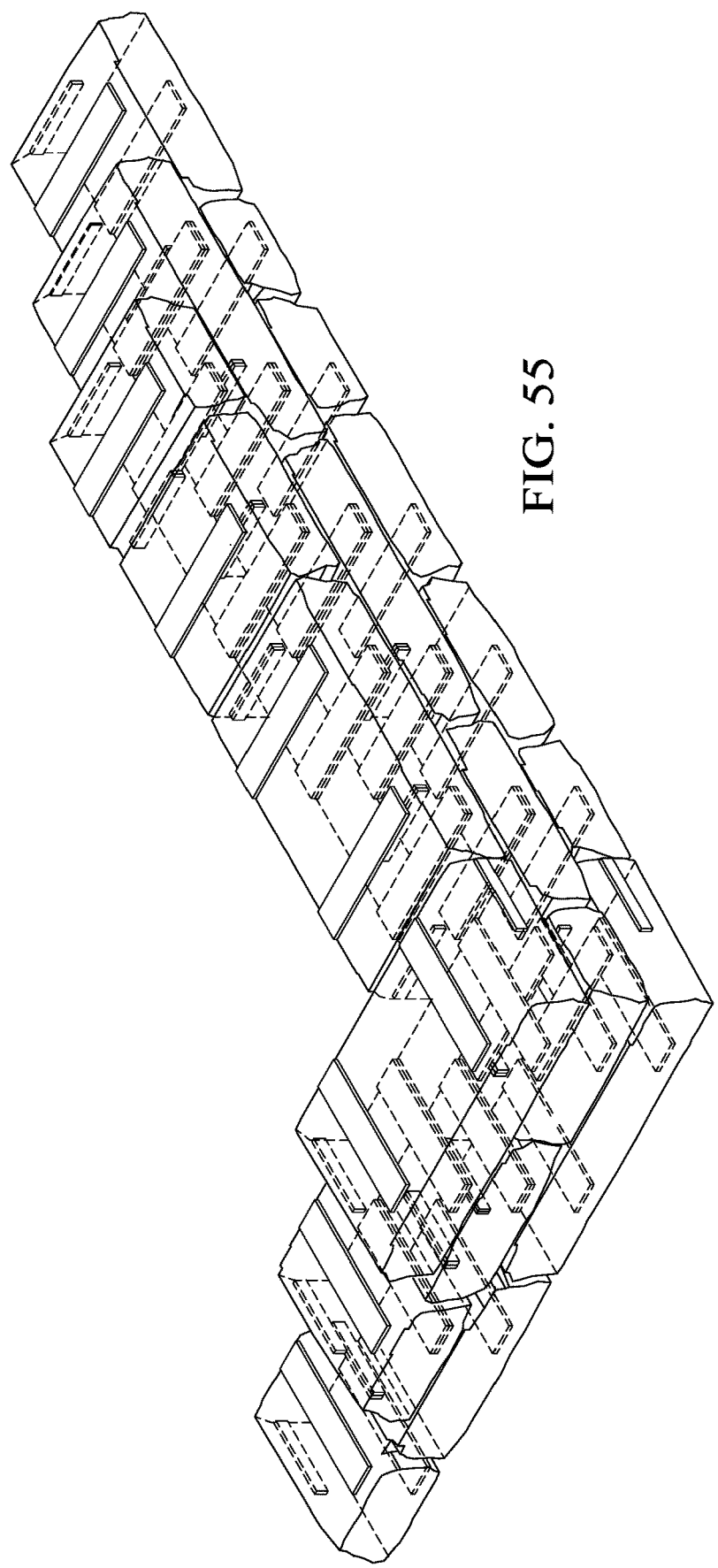
FIG. 55 shows an environmental view of a decorative manufactured block with load-bearing areas identified to show overlap, in accordance with an example embodiment of the present disclosure.

FIG. 55 shows an environmental view of a decorative manufactured block with load-bearing areas identified to show overlap, in accordance with an example embodiment of the present disclosure. As shown in FIG. 55, the load-bearing areas for each block overlap so as to provide a stable platform, while the areas outside of the load-bearing areas can be textured, weathered, roughened, worn, scored, tumbled or otherwise treated to create a variable appearance. Likewise, a suitable number of different designs like those shown in the FIGURES can be used and varied to allow a non-manufactured appearance to be created in a wall or other structure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A block, comprising:
a first side having a first predetermined load-bearing area between a substantially flat front, a substantially flat rear, a textured, non-load-bearing left side and a textured, non-load-bearing right side, and a first non-load-bearing area on the first side between the front and the rear, the first predetermined load-bearing area having a first predetermined size and a first predetermined location; and
a second side having a second predetermined load-bearing area between the front and the rear and a second non-load-bearing area on the second side between the front and the rear, the second predetermined load-bearing area having a second predetermined size and a second predetermined location; and
wherein the first non-load-bearing area has a profile that is different from the second non-load-bearing area when viewed from the front or the rear.

2. The block of claim 1 wherein the second non-load-bearing area comprises a plurality of separate non-load-bearing areas that are separate from the left side.

3. The block of claim 1 wherein the first non-load-bearing area is fabricated from a different material than the first load-bearing area.

4. The block of claim 1 wherein the first load-bearing area comprises a plurality of separate load-bearing areas that are separate from the left side and the right side.

5. The block of claim 1 wherein the first load-bearing area is directly above the second load-bearing area when the block is lying on the second side.

6. The block of claim 1 wherein the first load-bearing area is parallel to the second load-bearing area.

7. The block of claim 1 further comprising a third side having a third predetermined load-bearing area and a third non-load-bearing area, the third predetermined load-bearing area having a third predetermined size and a third predetermined location.

8. The block of claim 7 wherein the first load-bearing area is perpendicular to the third load-bearing area.

9. The block of claim 7 wherein the first load-bearing area and the second load-bearing area are perpendicular to the third load-bearing area.

10. The block of claim 1 wherein the first predetermined size is different from the second predetermined size.

11. A method of forming a block structure, comprising:
placing a first block on a second block having a textured side and a third block having a textured side, wherein each of the first block and the second block and the third block further comprise:
a first side having a first predetermined load-bearing area between a substantially flat front side and a substantially flat rear side, and a first non-load-bearing area between the front side and the rear side, the first predetermined load-bearing area having a first predetermined size and a first predetermined location;
a second side having a second predetermined load-bearing area between the front side and the rear side and a second non-load-bearing area between the front side and the rear side, the second predetermined load-bearing area having a second predetermined size and a second predetermined location; and
wherein the first non-load-bearing area does not extend beyond the first predetermined load-bearing area; and
aligning the first load-bearing area of the first block with the second load-bearing area of the second block and the third block.

12. The method of claim 11 wherein the second non-load-bearing area does not extend beyond the second predetermined load-bearing area and the textured side of the second block is adjacent to the textured side of the third block.

13. The method of claim 11 wherein the first non-load-bearing area is fabricated from a different material than the first load-bearing area and the textured side of the second block is a non-load-bearing side.

14. The method of claim 11 wherein the first load-bearing area has a predetermined load bearing capacity and the textured side of the second block is a left side or a right side.

15. The method of claim 11 wherein the first load-bearing area of the first block is directly above the second load-bearing area of the second block when the first block is lying on the second block.

16. The method of claim 11 wherein the first load-bearing area of the first block is parallel to the second load-bearing area of the second block.

17. The method of claim 11 wherein at least one of the first block and the second block further comprises a third side having a third predetermined load-bearing area and a third non-load-bearing area, the third predetermined load-bearing area having a third predetermined size and a third predetermined location.

18. The method of claim 17 wherein the first load-bearing area of the first block is perpendicular to the third load-bearing area of the second block.

19. The method of claim 17 wherein the first load-bearing area and the second load-bearing area are perpendicular to the third load-bearing area.

20. The method of claim 11 wherein the first predetermined size is different from the second predetermined size.

* * * * *